US012587534B1

(12) United States Patent
Orloff

(10) Patent No.: US 12,587,534 B1
(45) Date of Patent: Mar. 24, 2026

(54) SECURITY-BASED ACCESS AUTHORIZATION AND OPERATION

(71) Applicant: 8x8, Inc., Campbell, CA (US)

(72) Inventor: Rick Orloff, Alameda, CA (US)

(73) Assignee: 8x8, Inc., Campbell, CA (US)

( * ) Notice: Subject to any disclaimer, the term of this patent is extended or adjusted under 35 U.S.C. 154(b) by 100 days.

(21) Appl. No.: 18/522,006

(22) Filed: Nov. 28, 2023

Related U.S. Application Data

(60) Provisional application No. 63/541,132, filed on Sep. 28, 2023.

(51) Int. Cl.
H04L 9/40 (2022.01)
(52) U.S. Cl.
CPC .......... H04L 63/102 (2013.01); H04L 63/108 (2013.01)
(58) Field of Classification Search
CPC ... H04L 63/102; H04L 63/104; H04L 63/105; H04L 63/107; H04L 63/108; H04L 63/126; H04L 63/14
USPC ................................ 709/203, 220, 224–229
See application file for complete search history.

(56) References Cited

U.S. PATENT DOCUMENTS

| | | | |
|---|---|---|---|
| 5,473,732 A | 12/1995 | Chang |
| 6,424,935 B1 | 7/2002 | Taylor |
| 7,236,932 B1 | 6/2007 | Grajski |
| 8,788,535 B2 | 7/2014 | Bonev et al. |
| 10,142,329 B1 | 11/2018 | Liu |
| 10,318,617 B2 | 6/2019 | Gelfand et al. |

| | | | |
|---|---|---|---|
| 10,523,643 B1 * | 12/2019 | Davis ...................... H04L 63/20 |
| 10,616,345 B1 | 4/2020 | Quimette et al. |
| 10,735,592 B1 | 8/2020 | Liu et al. |
| 10,855,619 B1 * | 12/2020 | Andrews ................. H04L 63/20 |
| 10,902,114 B1 * | 1/2021 | Trost ...................... G06F 16/26 |
| 10,939,179 B2 | 3/2021 | Park et al. |
| 10,949,619 B1 | 3/2021 | Arsanjani et al. |

(Continued)

FOREIGN PATENT DOCUMENTS

| | | | | | |
|---|---|---|---|---|---|
| CN | 106255027 B | * | 2/2019 | ............. | H04R 29/00 |
| JP | 2020521212 A | * | 7/2020 | ........... | G06T 19/003 |

(Continued)

OTHER PUBLICATIONS

TheSandWraith: How to merge iOS messages conversation feed? Apple Inc., https://discussions.apple.com/thread/6566339, 4 pages (Sep. 27, 2014).

(Continued)

*Primary Examiner* — Khanh Q Dinh
(74) *Attorney, Agent, or Firm* — Vista IP Law Group, LLP

(57) ABSTRACT

Aspects of the present disclosure are directed to maintaining and using a persistent fidelity score to grant access and subsequently grant/deny access to a computer-based system (e.g., or data therein) by user entities. As may be implemented in accordance with one or more embodiments, a persistent fidelity score concerning characteristics associated with a user entity is generated based on activity of the user entity over a time period during which the user entity accesses a computer-based system. Continued access to the computer-based system by the user entity is selectively granted or denied during the time period, in response to the persistent fidelity score being within a threshold tolerance and based on characteristics associated with the user entity.

20 Claims, 15 Drawing Sheets

(56) References Cited

U.S. PATENT DOCUMENTS

| | | | |
|---|---|---|---|
| 10,994,800 B2 | 5/2021 | Noguchi et al. | |
| 11,012,433 B2 * | 5/2021 | Lakunishok | G06F 21/44 |
| 11,025,488 B1 | 6/2021 | Arsanjani et al. | |
| 11,044,338 B1 | 6/2021 | Arsanjani et al. | |
| 11,070,640 B1 | 7/2021 | Arsanjani et al. | |
| 11,196,866 B1 | 12/2021 | Samat et al. | |
| 11,425,252 B1 | 8/2022 | Martin et al. | |
| 11,445,063 B1 | 9/2022 | Driemeyer et al. | |
| 11,539,541 B1 | 12/2022 | Driemeyer et al. | |
| 11,551,005 B1 | 1/2023 | Arsanjani et al. | |
| 11,575,755 B1 | 2/2023 | Arsanjani et al. | |
| 11,575,791 B1 | 2/2023 | Arsanjani et al. | |
| 11,622,043 B1 | 4/2023 | Samat et al. | |
| 11,706,241 B1 * | 7/2023 | Cross | H04L 63/20 726/25 |
| 11,720,686 B1 * | 8/2023 | Cross | G06F 9/455 726/25 |
| 12,008,096 B2 * | 6/2024 | Smith | H04L 63/102 |
| 12,015,546 B2 * | 6/2024 | Kisa | H04L 45/70 |
| 12,019,740 B2 * | 6/2024 | Trost | G06F 16/26 |
| 12,282,536 B2 * | 4/2025 | Smith | H04L 63/0853 |
| 2003/0055974 A1 | 3/2003 | Brophy et al. | |
| 2004/0143559 A1 | 7/2004 | Ayala | |
| 2008/0086564 A1 | 4/2008 | Putman et al. | |
| 2009/0112875 A1 | 4/2009 | Maes | |
| 2009/0276215 A1 | 11/2009 | Hager | |
| 2010/0246800 A1 | 9/2010 | Geppert et al. | |
| 2011/0046960 A1 | 2/2011 | Spier et al. | |
| 2013/0247203 A1 * | 9/2013 | Nakawatase | G06F 21/577 726/25 |
| 2014/0100848 A1 | 4/2014 | Shaffer et al. | |
| 2015/0350443 A1 | 12/2015 | Kumar et al. | |
| 2016/0095056 A1 | 3/2016 | Lebon-schneider et al. | |
| 2016/0227035 A1 | 8/2016 | Kumar et al. | |
| 2016/0349960 A1 | 12/2016 | Kumar et al. | |
| 2017/0004373 A1 * | 1/2017 | Horiuchi | G06V 20/62 |
| 2017/0004573 A1 * | 1/2017 | Hussain | G06Q 20/40 |
| 2017/0006161 A9 | 1/2017 | Riahi et al. | |
| 2018/0234550 A1 | 8/2018 | Lifson et al. | |
| 2018/0315000 A1 | 11/2018 | Kulkarni et al. | |
| 2019/0097009 A1 * | 3/2019 | Wu | H10D 64/015 |
| 2019/0182287 A1 * | 6/2019 | Hanley | H04L 63/20 |
| 2019/0215249 A1 | 7/2019 | Renard et al. | |
| 2019/0377887 A1 * | 12/2019 | Bedi | H04W 12/08 |
| 2020/0342850 A1 | 10/2020 | Vishnoi et al. | |
| 2021/0112064 A1 * | 4/2021 | Losseva | H04L 63/102 |
| 2021/0173924 A1 * | 6/2021 | Trost | G06F 16/288 |
| 2022/0308720 A1 | 9/2022 | Korzhenevich et al. | |

FOREIGN PATENT DOCUMENTS

| | | | |
|---|---|---|---|
| WO | 2022/240433 A1 | 11/2022 | |
| WO | 2022/256028 A1 | 12/2022 | |

OTHER PUBLICATIONS

Alex Heath. Merge Clears Up Confusion by Combining iMessages From Multiple Device IDs Right In iOS [JailbreakCon]. https//www.cultofmac.com/category/news/, 9 sheets (Sep. 29, 2012).

8X8, "8x8 Frontdesk", https://www.8x8.com/products/business-phone/frontdesk?locale=us&utm_medium=paid-search&utm_source=google&utm_campaign=elite&utm_adgroup=Google_US_Search_Brand_Frontdesk|AAA_8x8_Frontdesk&utm_term=8x8%20front%20desk&type=Google_US_Search_Brand_Frontdesk&gclid=Cj0KCQiA4b2MBhD2ARIsAIrcB-RkZXOwVjVgTkcRcA_XSIAMzBFL5JJvV7M7xi9_fCrXSVOIZamU5OUaAii8EALw_wcB, downloaded Apr. 25, 2023.

8X8, "8x8 Work", https://www.8x8.com/products, downloaded Apr. 25, 2023.

8X8, "8x8 Work", https://www.8x8.com/products, downloaded Aug. 2023.

8x8 Admin Console, "Set up call park extension." 8x8, Inc. (2022), 1 sheet. https://docs.8x8.com/8x8WebHelp/admin-console/Content/Set_up_Call_Park_Extension.htm.

USPTO. Final Office Action dated Aug. 16, 2024, received for U.S. Appl. No. 17/839,157 of the instant Applicant/Assignee.

USPTO. Office Action dated Jun. 25, 2024, received for Design U.S. Appl. No. 29/842,406 of the instant Applicant/Assignee.

* cited by examiner 713      701

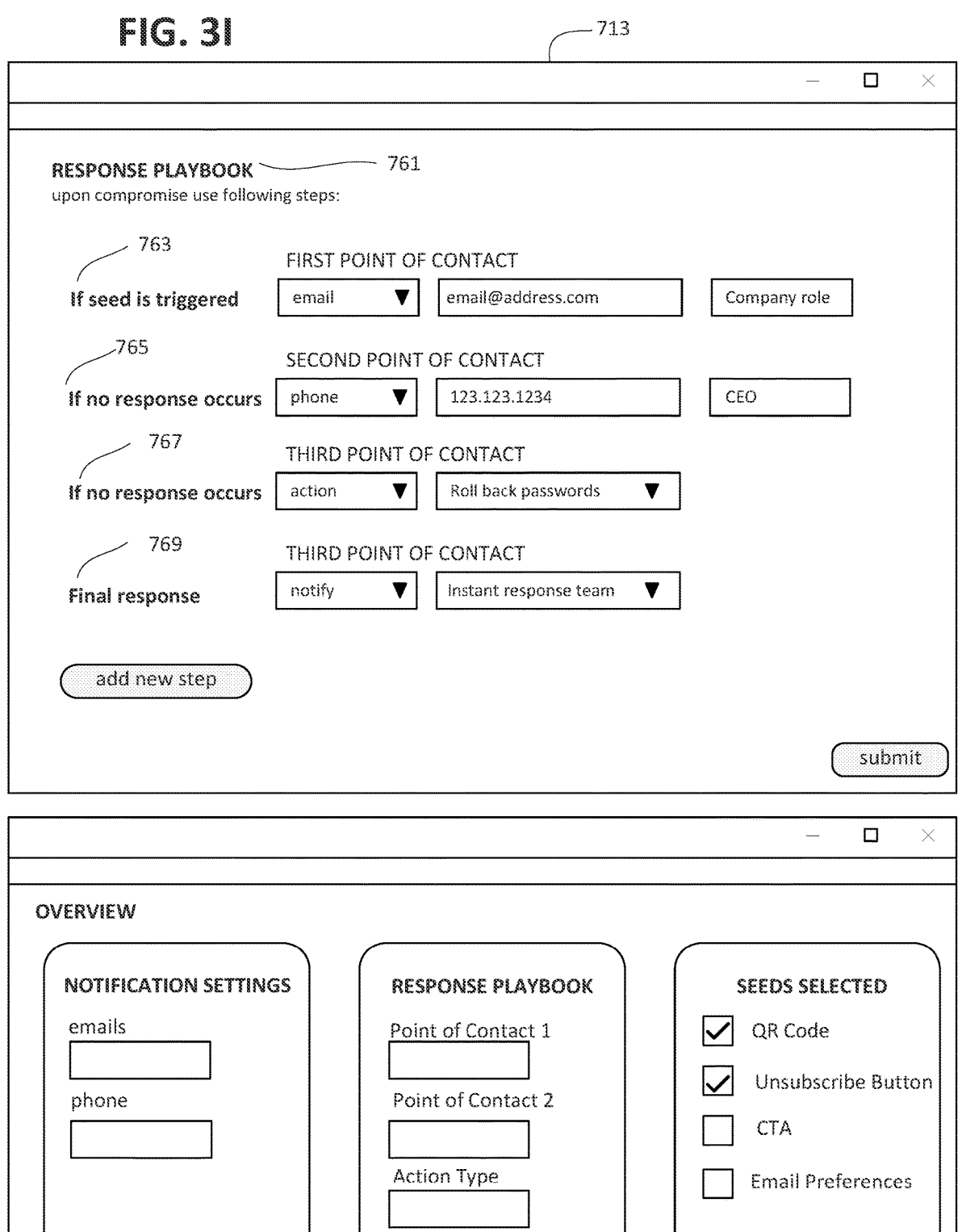

RESPONSE PLAYBOOK — 761
upon compromise use following steps:

763
If seed is triggered

FIRST POINT OF CONTACT

| email ▼ | email@address.com | Company role |

765
If no response occurs

SECOND POINT OF CONTACT

| phone ▼ | 123.123.1234 | CEO |

767
If no response occurs

THIRD POINT OF CONTACT

| action ▼ | Roll back passwords ▼ |

769
Final response

THIRD POINT OF CONTACT

| notify ▼ | Instant response team ▼ | add new step submit

---

OVERVIEW

NOTIFICATION SETTINGS emails phone more

RESPONSE PLAYBOOK

Point of Contact 1

Point of Contact 2

Action Type more

SEEDS SELECTED

☑ QR Code

☑ Unsubscribe Button

☐ CTA

☐ Email Preferences more submit

Start

Potential Compromise
601

Seed Triggered
603

Seed sends signal to Indicator
of Compromise System
605

Indicator of Compromise
determines association of
Seed with Pinecone
607

Indicator of Compromise
System assigns Fidelity Score
609

Indicator of Compromise
System initiates a Response
from the Pinecone Response
Playbook
611

SECURITY-BASED ACCESS AUTHORIZATION AND OPERATION

CROSS-REFERENCE TO RELATED APPLICATIONS

Aspects of various embodiments are directed to apparatuses (e.g., systems, devices, etc.) and to methods such as those described in the claims, description or figures in U.S. Provisional Patent Application Ser. No. 63/541,132 filed on Sep. 28, 2023, to which priority is claimed and which is fully incorporated herein by reference. For information regarding details of other embodiments, experiments and applications that can be combined in varying degrees with the teachings herein, reference may be made to the teachings and underlying references provided in the aforementioned Provisional Patent Application.

BACKGROUND

Various Electronic computer systems, networks, and physical devices are prone to attacks and/or theft. Such attacks may be launched externally, or they may be orchestrated by a bad actor within an organization. Intruders may not be detected until long after accesses are made, permitting time to gather data. In the event of physical breaches, intruders may seek out electronic devices likely to contain sensitive information such as laptops, cell phones, tablets, portable data storage devices, USB drives, and the like. In many cases, breaches are not actually detected until the perpetrator takes some overt action such as requesting a ransom for the data and/or devices In certain contexts, computer systems and their associated databases are accessed only after an individual attempting to access information via the computer system and/or database is validated. For instance, a general approach for managing such validation is referred to as identity lifecycle management (ILM), which involves a process of managing identities of prospective accesses by individuals, and their privileges (if any) to be authorized for such access. In some instances, for example, with respect to all employees of an company or a department within the company (aka, "organization" having members), the entire lifecycle of each such individual may be managed, from the beginning of when each such individual is identified as a prospective user attempting access to the end at which point each such individual is blocked from further access.

In certain exemplary contexts, secure access solutions may involve identification and authorization of a user, or service, at the time of an access request. After access has been granted, access may be permitted for example so long as there are no special breaches to specially-designated/restricted data. While useful, systems and approaches to providing secure access have been susceptible to processing errors and related issues with ensuring the security of data and other access-related characteristics.

SUMMARY

Aspects of various embodiments are directed to apparatuses, systems, methods of use, methods of making, or materials, such as those described in the claims, description or figures herein, all of which form part of this patent document. Certain aspects are directed to addressing security/control systems and related methods that may address issues as described hereinabove, for instance in processing access requests that may relate to a snapshot in time, a binary condition, and be location agnostic. For information regarding details of other embodiments, experiments and applications that can be combined in varying degrees with the teachings herein, reference may be made to the teachings and underlying references provided in the above-referenced provisional patent application.

As may be implemented in accordance with one or more embodiments, indicators of compromise are used to detect unauthorized intruders with a high degree of fidelity. Such indicators may provide real-time data to the system regarding the activity of users and/or sensors i.e. "indicators" as described herein. The indicators may be further configured such that permissible activity is readily differentiated, for instance in real-time or near real-time, from impermissible activity. Accordingly, various embodiments are directed to solving processing issues with regard to permitting access to restricted systems and/or data.

Various aspects of the disclosure are directed to creating and/or using a persistent fidelity score engine for users and/or entities as may be relative to devices with embedded electronics, such as those in vehicles, phones, computers, attached devices, home networks, and printers. Such approaches may be utilized in a variety of systems, such as with ILM systems characterized herein. The fidelity score may be adjusted in real time (e.g., 24 hours/day, year round, such as on a predefined interval) and can change what an end user is allowed to do on a network or for example what financial transactions might be approved (fraud prevention) or what other secure access requests may be approved.

In particular embodiments, individual indicators of compromise may be referred to as a seed. Various seeds may be grouped together into collections referred to as pinecones. Pinecones may be further associated with other data and systems such activity logs, user logs, monitoring systems, and the like. Seeds may include multiple interaction points, or touch points, whereby an interaction between a user and the seed triggers an action. These seeds (and pinecones) may be utilized in connection with a particular user or entity accessing systems and/or data for providing enhanced security. For instance, a metric indicative of a risk level may be provided based on seeds attributable to the user/entity and therein used to control secure access, for instance by requiring enhanced security inputs before granting access.

Various aspects of the instant disclosure are directed to differentiating between permitted and impermissible actions with a high degree of certainty, and/or to differentiating between authorized and unauthorized third parties with a high degree of certainty, the latter of which may involve unauthorized actions by authorized parties. Notifications and/or responses may be generated according to a fidelity score of a threat or compromise.

Another embodiment is directed to maintaining a persistent fidelity score concerning characteristics associated with a user entity, by generating the fidelity score and subsequently updating the fidelity score over a time period during which the user entity accesses a computer-based system, based on activity of the user entity over the time period. Continued access to the computer-based system by the user entity during the time period is selectively granted or denied in response to the updated fidelity score being within a threshold tolerance and based on the characteristics associated with the user entity.

In accordance with a particular embodiment, a method is carried out as follows, via data-processor computing circuitry. A persistent fidelity score is generated for a user entity, concerning characteristics associated with the user entity and based on activity of the user entity over a time period that includes an initial time period during which the user entity is selectively granted access a computer-based system based on the persistent fidelity score, and that further includes an ensuing time period during which the user entity continues to access the computer-based system. During the ensuing time period, the persistent fidelity score is updated based on further activity information corresponding to the user entity. Continued access to the computer-based system by the user entity is selectively granted or denied in response to the updated persistent fidelity score being within a threshold tolerance, and based on said characteristics associated with the user entity.

Another embodiment is directed to an apparatus comprising communications circuitry and one or more processing circuits. The communications circuitry is to communicate with a plurality of endpoint devices that provide interaction for user entities and access to a computer-based system. The one or more processing circuits are configured to generate, for each user entity, a persistent fidelity score concerning characteristics associated with the user entity, based on activity of the user entity over a time period that includes an initial time period during which the user entity is selectively granted access the computer-based system based on the persistent fidelity score, and that further includes an ensuing time period during which the user entity continues to access the computer-based system. The one or more processing circuits are further configured to, during the ensuing time period, update the persistent fidelity score based on further activity information corresponding to the user entity, and selectively grant or deny continued access to the computer-based system by the user entity, in response to the updated persistent fidelity score being within a threshold tolerance and based on said characteristics associated with the user entity.

Additionally, various aspects of the present disclosure may work in connection with any of various types of systems providing unified communications (e.g., unified communications as a service, 'UCaaS'), contact center communications (e.g., contact center as a service, "CCaaS"), communications platform as a service ("CPaaS"), for example, enabling usage of application programming interfaces (APIs) and the like to customize communication stacks and integrate chosen communication channels into applications, services, websites, etc., and/or a combination thereof (e.g., providing a platform which may be referred to as XCaaS (Experience Communications as a Service)).

The above discussion/summary is not intended to describe each embodiment or every implementation of the present disclosure. The figures and detailed description that follow also exemplify various embodiments.

BRIEF DESCRIPTION OF THE FIGURES

Various example embodiments, including experimental examples, may be more completely understood in consideration of the following detailed description in connection with the accompanying drawings, each in accordance with the present disclosure, in which:

FIGS. 3F-3H depicts a GUI element representation of modules to configure a seed, as may be implemented in accordance with the present disclosure, in which:

FIG. 3F depicts organization of seeds into categories of seeds,

FIG. 3G depicts an exemplary GUI element for configuring a QR Code type seed, and FIG. 3H depicts a custom seed configuration;

FIG. 3I depicts a GUI element representation of a module to configure a response playbook, as may be implemented in accordance with the present disclosure;

FIG. 3J depicts a GUI element representation of a module to configure a pinecone, as may be implemented in accordance with the present disclosure;

Figure 1A:
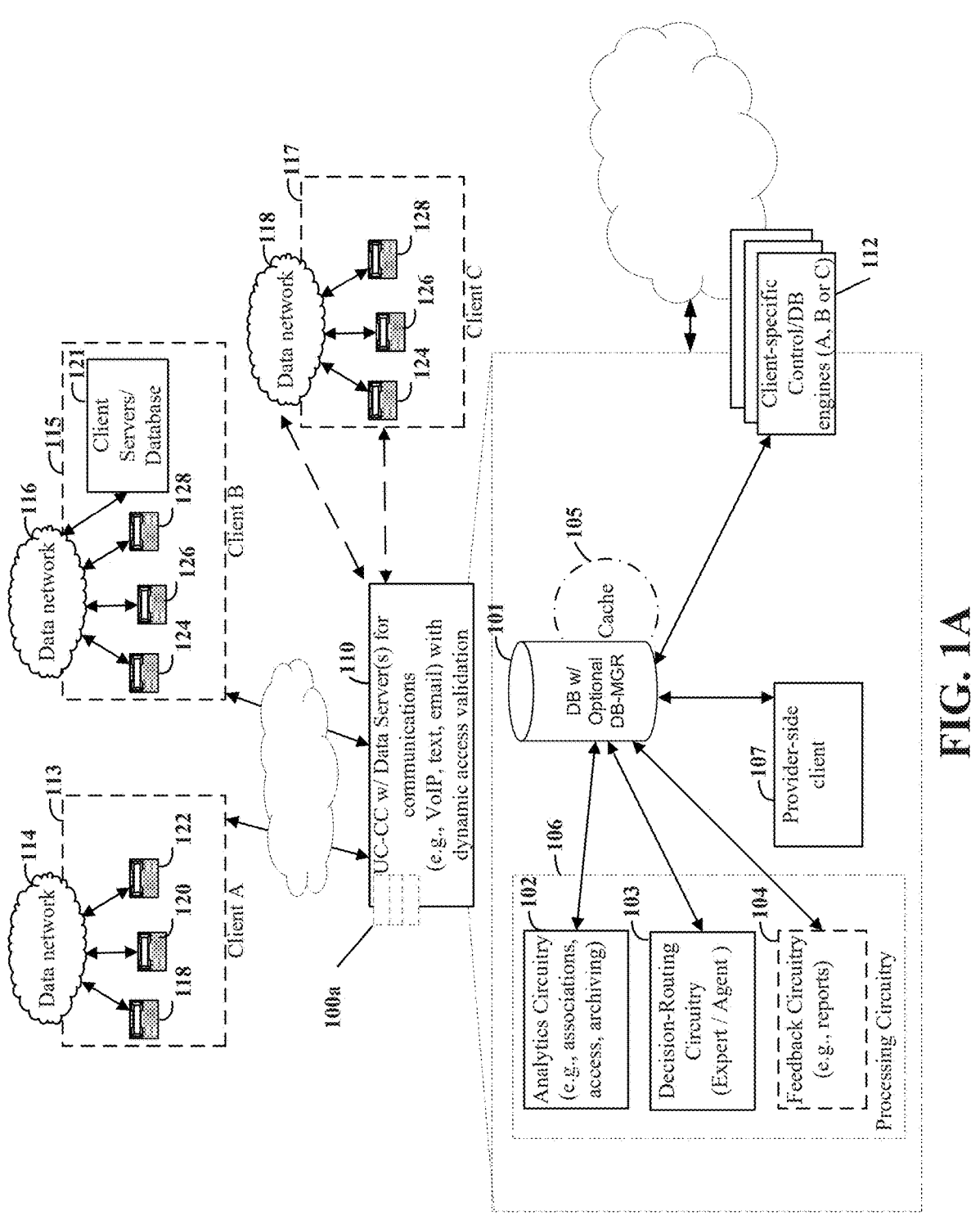
FIG. 1A illustrates an example data-communications system, as may be implemented in accordance with one or more aspects of the disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Various aspects and examples according to the present disclosure are directed to issues such as those addressed above and/or others that may become apparent from the following disclosure involving various methods and systems in which validation is persistently and dynamically provided, and in which may be provided during a time period when a user entity is effecting ongoing access.

In certain example embodiments, aspects of the present disclosure involve methods and/or systems that utilize ongoing (e.g., continuous) persistent assessment of user/entity fidelity assessment, such as may relate to ILM or other approaches, with customer engagement prompts or hooks. Consistent with the above, persistent assessment may involve assessing at an interval or otherwise over time, for example during a time period in which a user entity accesses computer system, data or other component, with ongoing assessments carried out for granting ongoing access (or for example terminating access where appropriate). In more specific examples, continuous fidelity scores are generated and provided, which are displayable to end users and/or an enterprise security team to improve data security and transparency (e.g., configurable solution as to who receives alerts, notifications, what actions are to be taken and how).

In one particular example, the present disclosure is directed to methods and/or systems configured to address problems with previously-existing approaches, involving approaches which grant access after an initial validation (such as whether or not an ILM approach includes a scoring method to authorize a user entity) and then, after access has been granted, the approaches do not: continue integrity checks and/or persistent validation in real-time (or very near real-time) (e.g., there are no continued checks and once the user is in for authorized access, the user stays in, you are in). This can be problematic in instances where it is discovered that the user's status has changed). As examples of such problematic instances, lack of persistence can lead to: avoidable losses due to fraud and system compromises; compromised networks average 281 days before detection (aka Dwell Time); and decreased user efficiency and reduction in productivity for a company when security issues arise as resources (time and manpower) have to be diverted to address such issues that could have been avoided.

As utilized herein, reference to a "user entity" or "user" may refer to an individual (human) operating a computer-based device, or embedded electronics operating to access a computer-based system and/or data. Embedded electronics may be provided in phones, computers, attached devices, home networks, printers, vehicles and other systems. Providing or granting access may involve providing access to a computer system, providing access to data controlled by a system, providing access to modify data or programming, and access to cloud-based data, as non-limiting examples. Reference to a "persistent" fidelity score refers to a score that is provided over time so that it persists for a particular user entity, and is updated over time in response to one or more conditions such as may relate to security checks carried out at a frequency that may be predefined or adjusted based on one or more conditions. For instance, checks may be carried out at a higher frequency during times of expected attacks or based on user entity activity. The complexity of checks may also vary based on such conditions, for example in performing more comprehensive checks during times of expected attacks or based on security risks associated with a particular type of access to be granted.

In another particular example, the present disclosure is directed to methods and/or systems configured to address problems with previously-existing ILM approaches, involving ILM systems that include a scoring method at the outset to authorize and/or validate a user seeking access. According to the present disclosure, if scoring is included, the scoring may be updated in near real-time or otherwise updated dynamically to include one or more extensive lists of security artifacts that can paint a truer near real-time picture of use cases linked to the user.

In other particular examples, the present disclosure is directed to methods and/or systems configured to address problems with previously-existing approaches, such as may involve ILM approaches that grant access after an initial validation and then, according to the present disclosure, continue to correlate with scoring for the user with metrics associated with one or more of confidentiality, integrity, and availability (aka HA and/or CIA).

In yet further particular examples, the present disclosure is directed to methods and/or systems configured to provide continuous fidelity scoring in a manner that is dynamic and updated in real-time (i.e., can change in real time) with features such as one or more of the following:

(a) Floating/scaling scoring (end user can see). Integrity scores may be continuously reviewed, an event trigger may change scores, such as in response to a change in security posture;

(b) A pre-developed algorithm and/or also driven by (or enhanced) by Machine-Learning and/or Artificial Intelligence ML/AI modeling (as may be beneficial such that modeling can learn, scale and be extensible);

(c) ML/AI integration aspect(s) as may involve correlating a large volume of security artifact data as well as an adaptable and scalable solution; and (d) Fidelity score algorithms automatically adjust based on the thousands of forensic artifacts feeding a data communications server system which provides data-communications services including, as examples, virtual office communications via a contact-center such as exemplified by the assignee of the present disclosure (8×8, Inc. as indicated at www.8×8.com) and as characterized in one or more of the figures included as part of the present disclosure).

In yet further particular examples, the present disclosure is directed to methods and/or systems configured to a system (or engine) applicable (e.g., customized and configured) to multiple products for multiple business types (non-limiting examples include: engine for most any type of CPU-based software environment/software platform(s); customer-to-business (C2B) and/or C2C environment(s) and/or various other types of data-communications platform(s). Such aspects may pertain to an ILM system as characterized herein.

In yet further particular examples, the present disclosure is directed to methods and/or systems configured to a system in which scoring can be used for non-limiting purposes including but not limited to: i) automatically request re-validation of user; ii) proactively send notifications/alerts of potential issues (e.g., to security team and/or end user), where there are configurable to include native end user actions and/or an available signal (e.g., SOS beacon) to alert a security team for the system; (iii) enable a security team to cut off access or request re-validation (possibly automatically send alerts and then enable security team to take manual action), where there are: SIEM (security incident events management) platforms, native alerting with pre-built rule sets to security incident events, and/or best-practice playbooks for and involving a security operations center (SOC); iv) enable users to proactively take action to update their fidelity score in real-time to avoid validation issues; and/or vi) apply learning modeling (ML/AI integrations) to enhance fidelity scoring (and created learning model that is adaptive over time), as well as analyze fidelity scores, underlying data, and/or actions and responses from users, enterprise security team, etc., to generate data insights and suggestions for company around data security.

For such ML/AI integrations, further detailed aspects may involve one or more of the following. Data security Insights/suggestions may be implemented in-app or through connected devices, such insights/suggestions being compiled into reporting. This may be useful for a company to evaluate how organizations (e.g., within a company) are operating with respect to data security and the strengths and weaknesses of an organization from a data security standpoint. Best practice playbooks for a Security Operations Center (SOC) may be developed and learned over time with contextually relevant analytics and suggestions using ML/AI algorithms that correlate data and establish key points for data inflexion.

Further particular examples of the present disclosure are directed to methods and/or systems in which trigger endpoint detection and response (EDR) alerting are utilized. In some examples, the system can set thresholds or ranges for triggering alerts and responses, and might create flags for activity or patterns of activity before alert is generated. This system and process can be used to continuously train and develop models to be more accurate and precise with future scoring and predictions.

Employees needing temporary system access can be challenged to an acceptable level. System access changes can be approved automatically, and alternatively, can be managed according to preferred rule set of a security team. In one such example, the fidelity score drops as others are trying to use the same credentials or artifacts. This can be a tell-tale sign that it may be time to revalidate a user. In other examples, fidelity scores can be increased based on proactive activities taken by user. For example, ML/AI modeling can be trained based on activities taken by users (or suggested actions) that increase fidelity scores, for instance by utilizing additional verification steps. Data insights/suggestions can be generated and cascaded to users and/or added into reporting that is generated (proactive reporting or retroactive summary of user activity (individual or group/organization)).

Consistent with the above aspects and examples, aspects of the present disclosure may be implemented to provide exemplary technical advantages. Such exemplary technical advantages may be provided by processing described in the present disclosure and may comprise but are not limited to: consistent persistent validation of user access including automated generation of validation decisions including triggering of endpoint detection and response alerting; improved processing for management of user activity data to generate meaningful real-time (or near real-time) classifications regarding levels of user activity that are contextually relevant and understandable; improved data security and reduction in likelihood of security threats including through additional levels of access control management; greater system efficiency and uptime when applied through proactive reduction of security threats; generation and application of novel algorithms that is adapted to generate predictive fidelity scoring for persistent identity lifecycle management and/or insights from contextual relevance analysis of exemplary security artifacts; implementation of one or more trained machine learning models (e.g., a hybrid machine learning model) to execute to improve efficiency and accuracy in generation of identity lifecycle management determinations including exemplary fidelity scoring, identity management determinations, data insights, notifications, etc.; ability to customize weighting of exemplary security artifacts for contextual relevant use cases including through usage of historical and current iterations of security artifacts (customizability based on use case or multiple use cases); ability to generate customized data security rule sets for ability auto-generate data security reporting and best practices including data relevant insights/suggestions; improved user transparency around organizational data security and proactive actions to improve data security and minimize threat levels with real-time (or near real-time) notifications including through an adapted graphical user interface (GUI); improved processing efficiency (e.g., reduction in processing cycles, saving resources/bandwidth) for computing devices when performing identity management and control of user access; reduction in latency of data security determinations through efficient processing operations that improve correlation of a larger volume of security artifacts; improving usability of host applications/services for users via integration of processing described herein; and extensible and scalable solution that can be adapted for any type of system or even include multiple iterations for targeted use cases within an environment, among other technical advantages.

Certain embodiments involve correlation of different types of security artifacts, any (and/or all) of which can be related to a fidelity score. Modeling can be configured to analyze real-time data, historical data, or a combination thereof. A variety of non-limiting examples of security artifacts that can be used to generate fidelity scores individually and/or in combination are discussed in the following discussion.

User profiles may be utilized to generate a fidelity score for a particular user entity, for a specific access or for general access. For instance, multiple data points may be confirmed for user entities across information accessible, as may pertain to an individual user, a business profile, a system profile, and others. User-specific signal data may be generated by usage, user calendars, or scheduling. Communications by a user entity through communications platform(s); e.g., user email, chat message, or communication through other modalities (historical and/or current) may also be used to assess the user entity for a fidelity score. For instance, tone or context of conversations may be used to assess a user's fidelity. User-based analytics may also be used to generate a fidelity score. For instance, user preferences for usage of apps, browsing history, and more could be used to assess that user's fidelity. Time usage and patterns may also be utilized, with changes in such patterns possibly signaling a security issue. For instance, what does the user's typical workday/activity time look like, user-specific usage patterns for sign-on, sign-off, and more. Such aspects can be learned over time and used to identify outliers in user activity that may be considered as being suspicious Such information may also be utilized to confirm that a user is in fact who he/she/it proposes to be. For instance, identifying inconsistent use of apps and browsing may be an indicator that a false entity is attempting to access using a legitimate user's profile. In a similar vein, canary credentials (phishing/alerts) can be assessed in this regard relative to known behavior of a particular user.

Fidelity scores may be tied into requests made by the user entity(s) for which the scores are generated. For instance, business requests such as those relating to travel or tasks may be assessed (e.g., travel-related, task related) on a basis of the nature of the travel or tasks, and relative to the nature of the user (e.g., employee, manager, executives). Scores can be assessed relative to meetings or events such as corporate events, in which a user can be scheduled to attend meeting/event at a scheduled time/location. In such instances, requests for access may be received at a different location at the same time, or with other varying characteristics.

Device information pertaining to a device via which access is requested may also be utilized in assessing a fidelity score. For instance, if a user is accessing systems/ information from a device considered to be less secure, for instance a public computer, the fidelity score may be downgraded or otherwise set in accordance with the device. If a user is accessing via a device that is considered to be highly secure, for instance a computer within a managed facility, the fidelity score may be upgraded or otherwise set accordingly. A variety of types of devices may be assessed accordingly, such as may relate to device endpoints, UDID, computer device IDs (including connected (peripheral) devices, USBs), each of which may have an associated impact on fidelity scores (e.g., with weighting applied in accordance with ML/AI type monitoring over time). Peripheral identifiers may be used to impact fidelity scores, such as may relate to SIM, eSim, and/or IMEI numbers. For network data and endpoints, characteristics such as mac addresses, IP addresses, virtual machine type, embedded devices, VPN access, servers, and IOT connections may be respectively used in assessing fidelity scores.

Other aspects that may be utilized in assessing fidelity scores may include one or more of: geolocational information, communication protocol connection information (e.g., wired, wireless, Bluetooth, infrared), badge scan/readers, QR codes/scans, authentication information (e.g., biometric, multi-factor (MFA), VPN, VRN, authentication data), security protocols (endpoint security) status (e.g., as may relate to VPNs, firewalls, anti-virus, status of data security protection apps (e.g., phishing, malware, ransomware, spam blocker, etc.)), third-party integrations (e.g., W3W, CRMs, Slack), customer interactions (e.g., marketing, sales), application-specific signal data, and integrated software platform(s).

In certain embodiments, third-party intelligence may be utilized in assessing fidelity scores. Such intelligence may come from security organizations, affiliated vulnerability disclosure programs (e.g., HackerOne), known threats, and issues raised with third-party products/services (including those integrated with a software platform). Further, internet/ web (can integrate any information available via web) details can be utilized, In accordance with various embodiments, access to assets is controlled based on fidelity scores specific to the assets and/or a grouping of such assets. For example, assets may have tailored thresholds with regard to fidelity scores, in which fidelity thresholds may be assigned directly to particular assets and/or to groups of assets. Such fidelity thresholds can be utilized to limit what assets a user entity can access, for instance as to what systems and/or what resources can be accessed. Such an approach may be based on asset value, for instance in which a user entity may be denied access to assets with high values while being granted access to assets with low values. Actual usage can configured and customized based on organizational use cases, and rules may be set for automatic blocking, requests for approval, and more.

In certain embodiments involving fidelity thresholds, the thresholds are persisted in that they are updated over time based on one or more of a variety of conditions. For instance, certain assets may pertain to a type of condition for which secure access is known (or learned, via AI/ML) to be of a certain fidelity value. As external conditions change, for instance a national security level, hacker threat level, or others, the threshold values may be raised or lowered accordingly. Such thresholds may also be updated based on an event or other condition, for instance if a company is expecting to issue an earnings report or to publicize certain sensitive information such as downsizing plans, thresholds applied to sensitive assets may be increased. Algorithms may be tailored for specific assets or groups of assets in this regard, to set thresholds accordingly. Furthermore, such thresholds may be tailored to individual assets or companies, which when used together with persisted fidelity scores that may be applied to user entities on a wider basis, providing an opportunity to tailor the application of fidelity scores while maintaining a general/main fidelity score in an efficient manner.

Weighting may be utilized to generate fidelity scores in a variety of manners. For instance, different types of security artifacts can be weighted to generate fidelity scores. Such artifacts may pertain to different types of security conditions that, when taken together, are used to generate the fidelity scores. For example, artifacts pertaining to security conditions of higher concern can be weighted more heavily than those pertaining to security conditions of lower concern. Such an example may, for example, relate to a user's spending trends in which long-term trends are weighted lower than short-term trends. User behaviors may be weighted similarly, for example with higher weight assigned to behaviors associated more closely with fraud or other scrupulous activities (e.g., multiple failed attempts to access highly sensitive data), and lower weight assigned to behaviors that may not necessarily be related as such (e.g., multiple failed attempts to access less sensitive data). In some instances, weighting can be contextual and depend on a contextual change. In such instances, weighting can be rule-based, and change based on applicable set of rules. For example, if a user is connecting from a location at corporate headquarters, different factors may be weighted as compared to a user connecting from a remote location. This may be further related to a type of access and/or a type of device used for access, where an on-site computer may be controlled more closely than a remote computer accessing a corporate system, such that higher weighting may be applied to all accesses or accesses to a group of asset types from the remote computer relative to accesses from the on-site computer.

In connection with one or more embodiments, fidelity scoring is automatically adapted to learn user behavior and identify potential deviations from activity that could be a trigger for re-validation. This can create different versions of modeling to be applied to different types of accesses and/or segments of business. For instance, if user behavior with respect to interacting with a system, or behavior outside of the system is, suggestive of negative behavior such as insubordination or corporate theft, such deviations may be utilized to trigger a re-validation of a fidelity score of that user. Such behavior may involve, for example, requests to access particular databases, or particular systems, that may deviate from historical activity and/or from activity associated with a particular user's job requirements.

Further embodiments are directed to presenting a menu-driven GUI and/or user experience (UX) relating to the generation of persistent fidelity scores. Natively incorporated or add-on operations can be integrated or work with a native solution. Certain UX menu-based operations include presenting access to fidelity scores and related user activity for evaluation. Real-time representations of an exemplary fidelity score that updates dynamically can be provided and used to assess such scores and/or the generation of such scores (e.g., for modifying algorithms for continued generation of fidelity scores). Alerts, notifications, warnings in-app and/or through other modalities, associated devices, and such can be provided, for example to indicate activity associated with high risk. Data insights, suggestions, reporting, data security best practices may be provided via such a GUI or UX, and aspects may involve identifying relevant security artifacts, and contextual scenarios that contribute to current fidelity scoring. Recommended actions to improve fidelity scores can be presented, and menu options for communication with a security team and/or integrations of additional data sources may also be provided.

Certain embodiments may be characterized in the context of individual indicators of compromise referred to as seeds that may be grouped together into collections referred to as pinecones. Pinecones may be associated with other data and systems such activity logs, user logs, and monitoring systems. Seeds may involve multiple interaction points, or touch points, in which interaction between a user and the seed triggers an action. As may be implemented with other embodiments herein, seeds (and related interaction points) may be utilized in assessing a fidelity score for a particular user entity.

By way of example, a pinecone e.g., file, may be located on an authorized users production server, laptop, cell phone, and/or cloud account, etc. These pinecones are configured with unique seeds that are triggered by accessing, moving, reading, or interacting with the pinecone or its seeds. Each time an intruder (such as a user entity) interacts with an individual seed, this causes unique independent alerts related to the specific pinecone and specific seed to be sent to an Indicators of Compromise "IOC" system for correlation and alerting. Because the pinecone is unique, and can contain unlimited unique seeds, all sending back unique independent signals and alerts from disparate systems and services, the correlated result is an extremely high fidelity conclusive alert.

As a specific example, a cell phone may be a seed in the context of embodiments herein. As cell phones are readily tracked, if a cell phone moves beyond a prescribed area, which could be established, for example, by GeoFencing or the like, the cell phone may communicate its location to the Indicator of Compromise System. Further, cell phones are commonly used for storing private data. Accordingly, a cell phone (or a laptop, tablet, USB device, etc.) may further include data files configured as pinecones and/or seeds. Such data files may be used as bait, that is, the data files may contain information such as monitored bank accounts or the like, enticing intruders to take action based on the data, thereby resulting in disparate systems sending information back to and analyzed by the Indicator of Compromise System. According to embodiments of the invention, devices can be production 'in-use' or "dummy" devices, such as laptops, cell phones, USB drives, or the like, are bait. Such dummy devices may be devoid of critical information or secrets, and instead contain only seeds such as data files. Dummy devices may be strategically located such that the dummy devices entice an intruder to take or otherwise interact with the device. Accordingly, dummy devices may, themselves, be bait. For example, a dummy laptop may be left in a commonly accessed conference room. The dummy laptop may be further identifiable as belonging to an executive or other likely target who might routinely be privy to valuable data. For example, the laptop may be labelled with a name, or may be the same make and model as a laptop known to be used by the target. According to embodiments of the invention, interacting with the laptop may send a message to the Indicator of Compromise System. For example, merely opening the laptop, or attempting to log into the laptop, may send a signal to the Intrusion Detection System for analysis. Seeds and touch points are described in greater detail below.

A further aspect of the system is timely notification by the system when a seed is triggered. A notification, or response, might be, for example, an email, a phone call, an SMS text message, system alert from a cloud service, or the like. Responses can be further organized into response playbooks. Response playbooks may include multiple responses. For example, a playbook might have an email address for a first point of contact, a phone number for a second point of contact, and so on. In embodiments, a response might include an action event such as automatically rolling back or changing system passwords, modifying firewall rules, disabling accounts, and/or notifying the emergency response team. A playbook may be configured to generate responses sequentially, contemporaneously, or in combinations. For example, the first response in a playbook may be to send an email. If no response is received from the email, the next step in the playbook might be to simultaneously send an SMS text message to a first phone number, and place a telephone call to a second phone number, such a call center. Response playbooks may be associated with pinecones. As pinecones may have multiple seeds, it is possible for a variety of intruder actions to trigger a multiple responses according to a playbook. Further, depending on the actions the intruder takes, the Indicators of Compromise system may determine whether the intruder is a hacker looking to monetize the intrusion or, if the intruder is a sophisticated nation state pursing other nefarious objectives.

In various embodiments, a method of detecting an intrusion includes receiving at a server a signal generated by a pinecone comprising one or more seeds. Each of the one or more seeds includes one or more independent touch points. Each of the one or more touch points is configured for interaction by an intruder or unauthorized party. At the server, a fidelity score is determined for a signal or signals that may be created for each pinecone and seed as may relate to interaction with a pinecone. Once the pinecone is opened, signals may be provided for seeds. The higher the fidelity of the score, the more intrusive the mitigation may be as defined by a response playbook.

In various embodiments, the response includes one or more action events. Such action events may be designed to mitigate the intrusion in seconds or minutes. The high fidelity alert occurs before the victim is aware the intrusion occurred and before the unauthorized party is able to benefit from the intrusion. Each of the one or more action events occurs independently of one another and contributes to the fidelity score. In various embodiments, a touch point is an email address, a telephone number, a URL, a QR code, an application, a service, a physical device, or an electronic device. In various embodiments, the email address is configured to allow an intruder to log in or attempt to log into the account. Once in the account, there may be additional seeds for the intruder to interact with. There may be counterespionage information for the intruder. Servers and services are configured to log long headers, user and device attribution information from emails. In various embodiments, the telephone number is a virtual telephone number, and the server is configured to log a call to the virtual telephone numbers and/or log device and user information when interacting with the service or servers. In various embodiments, the server is configured to log access to the URL. In various embodiments, the server is configured to log access or interaction to the QR code. In various embodiments, logs may include user and device attribution data. In various embodiments, the response is logging the interaction with the one or more touch points. In various embodiments, the response is alerting a point of contact(s). In various embodiments, the point of contact is alerted through an email, a telephone call, or a SMS message. In various embodiments, the point of contact is alerted through electronic delivery. In various embodiments, the point of contact is a law enforcement and/or intelligence gathering agency. In various embodiments, the point of contact is a response team. In various embodiments, the point of contact is the victim of the intrusion. In various embodiments, the response is a disabling accounts, change of system passwords to predefined passwords or onetime use passwords (OTP), replacement of computing hardware, or reformatting/resetting software operating systems to their "known good" configurations. In various embodiments, the response is to dispatch law enforcement for real-time tracking and interception, or apprehension, of the intruder.

An indicator of compromise system, according to embodiments of the invention includes a plurality of indicator of compromise sensors each configured to generate an independent intrusion signal, thus creating an indicator of compromise high fidelity mesh. For instance, a seed can produce a binary result, such as by noting that it is certain that an unauthorized party tried to log into an email account/seed (e.g., attackers trying multiple passwords). Such an instance may relate to a single seed and one signal, and a response can be carried out with the certainty that the access attempt is an attack. If the same alert comes in along with six independent alerts from other seeds from the same pinecone, this could be used to confirm that an attacker is interacting with the pinecone. In this context, the correlation of six seeds or twenty seeds for example may provide a high-fidelity mesh.

The indicator of compromise system may further include a processor and a computer readable storage medium having program instructions embodied therewith. The computer readable storage medium is not a transitory signal per se. The program instructions executable by the processor to cause the processor to receive an indicator of compromise signal; log the indicator of compromise signal; assign a fidelity score to the indicator of compromise signal; and provide near real-time alerting if the fidelity score exceeds a threshold, along with a response plan. In embodiments, program instructions are executable by the processor to further cause the processor to generate a dashboard. The dashboard is configured to display GUI elements providing an indicator to a user of at least a status of the plurality of indicators of compromise sensors and an indicator of compromise signal.

According to embodiments of the invention, a computer readable storage medium, tangibly embodying a program of instructions executable by a computer for detection of intruders or unauthorized third parties, the program of instructions, when executed by a processor, performs a method including: receiving an indicator of compromise signal; analyzing the indicator of compromise signal; and selecting one or more responses from a response playbook. The one or more responses are associated with the indicator of compromise and/or a specific seed within the pinecone.

In various embodiments, an indicator of compromise includes an action performed by a third party. The step of analyzing the indicator of compromise may include determining whether the action is authorized or unauthorized. In various embodiments, the step of analyzing the indicator of compromise comprises assessing a threat level associated with the indicator of comprise. In various embodiments, a user selects the association between the one or more responses and the indicator of compromise. In various embodiments, each of the one or more responses generates a notification defined by a user or administrator.

As discussed above, various aspects of the present disclosure may be implemented in connection with the underlying provisional patent application as noted above. Certain embodiments are directed to implementation with the embedded figures disclosed therein. For instance, consistent with certain aspects of the present disclosure, fidelity-related scoring may be dynamically changed based on artifact correction and an acceptable score threshold that may be set and adjusted to suit particular applications (e.g., as may be set by a user/customer). Engine rules may allow for automated challenges based on transaction type, risk or threshold. For instance, thresholds may be higher for high-security applications such as enterprise-based applications or those involving national security, or lower for small businesses. Algorithms may be utilized to weight individual and collective artifacts and assign an appropriate score based on risk. These may be tailored to specific customer systems. Certain approaches may utilize a modular and scalable flow, in which raw data, correlated data and enterprise data may be processed by an access engine (circuitry), to generate action oriented outcomes.

As also related to the above-noted embedded figures, certain customer to business (C2B) applications involve the following flow as may be carried out in a security engine (circuitry/computer with special programming). A customer creates a secure email alias, which is then to be used in all financial accounts (e.g., login, notifications). Legitimate emails are validated and forwarded (e.g., to a customer/user) for processing. Emails received directly and identified as fraud/phishing are reported and feed a threat product. A customer may load preferred communications into a security engine, such as certain messaging series or emails, which may be used to send/receive verification.

As may be recognized from the above, aspects of the present disclosure are believed to be applicable to a variety of different types of apparatuses, systems and methods involving ILM. In certain such contexts or applications: continuous persistent ILM with customer engagement hooks and/or continuous fidelity scores are generated and provided. Continuous fidelity scores may be generated and provided (displayable to end users and/or an enterprise security team to improve data security and transparency such as configurable solution as to who receives alerts, notifications, what actions are to be taken and how). Continuous fidelity scoring may be dynamic and updated in real-time (i.e., can change in real time) based on extensive security artifacts. Score updated in real-time (or near real-time) based on interaction points to real-time view of user's fidelity score that update dynamically, enable alerts to be presented (endpoint detection and response), actions to be taken, and data insights/suggestions for identity management.

Furthermore, aspects of the present disclosure are directed to systems and methods that implement trained ML/AI processing to further contemplate other types of signal data that may be collected through various host applications/services (e.g., pertaining to a software platform). For instance, application of trained ML/AI processing (e.g., one or more trained machine learning models) may be adapted to evaluate not only data and data sources integrating with a security engine for assessing and controlling accesses, but other types of contextual data including past and/or current user actions, user preferences, application/service log data, etc., that are each associated with one or more users, entities, systems and/or endpoint devices. This additional signal data analysis may help yield determinations as to how (and/or when) to generate updated analytics (in real-time or near real-time) and/or reporting, as well as when and how often to present data insights and/or suggestions.

Non-limiting examples of signal data that may be collected and analyzed includes but is not limited to: device-specific signal data collected from operation of one or more user computing devices; user-specific signal data collected from specific tenants/user-accounts with respect to access to any of: devices, login to a distributed software platform, applications, services, etc.; application-specific data collected from usage of applications/services and associated endpoints (including third-party endpoints integrated within a software platform), data collected from disparate software platforms that provide disparate types of access characteristics (e.g., as may be used to generate a fidelity score); or a combination thereof. Analysis of such types of signal data in an aggregate manner may be useful in helping generate contextually relevant determinations, data insights, etc. Analysis of exemplary signal data may comprise identifying correlations and relationships between different types of signal data specific to user usage of one or more software data platforms (e.g., communications software platforms), where telemetric analysis may be applied to generate determinations with respect to a contextual state of user activity with respect to different host application/services and associated endpoints. Analyzing of signal data, including user-specific signal data, may occur in compliance with user privacy regulations and policies.

In some examples, one or more components are configured to manage application of one or more AI models to enhance processing described in the present disclosure. Trained AI processing is applicable to aid any type of determinative or predictive processing including specific processing operations described with respect to determinations, classification ranking/scoring and relevance ranking/scoring. An exemplary component for implementation trained AI processing may manage AI modeling including the creation, training, application, and updating of AI modeling. Trained AI processing may be adapted to execute specific determinations described herein including those for analyzing specific data and data sources of a software platform (e.g., a communications software platform) and/or generating insights for data augmentation. For instance, an AI model may be specifically trained and adapted for execution of processing operations pertaining to analyzing features and functionality of an XCaaS offering including those non-limiting examples previously described. Non-limiting examples of AI implementation including but are not limited to: analyzing data (and metadata) associated with one or more software platforms including third-party integrations; assessing indicators relative to accesses; and modifying approaches to assessing security risk levels over time relative to a user/accessing entity or other external characteristics. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In alternative examples, the present disclosure extends to integrating third-party AI modeling and further adapting and customizing said AI modeling to work with specific data and data sources of an exemplary software platform. For example, a third-party AI model may be adapted to work with a communications software platform including data, data sources, and integrations (e.g., APIs, web hooks, etc.) related to XCaaS features and functionality. In examples where a plurality of independently trained and managed AI models is implemented, downstream processing efficiency may be improved by an ordered application of trained AI models where processing results from earlier applied AI models can be propagated to subsequently applied AI models. For example, a trained AI model may evaluate accesses, seeds, pinecones, indicators, external influences, weighting and the like, and derive data correlations to improve processing and efficiency. This may be utilized to adjust weighting and/or assessed risk levels based on the evaluations.

Non-limiting examples of supervised learning that may be applied comprise but are not limited to: nearest neighbor processing; naive Bayes classification processing; decision trees; linear regression; support vector machines (SVM) neural networks (e.g., convolutional neural network (CNN) or recurrent neural network (RNN)); and transformers, among other examples. Non-limiting examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting examples of semi-supervised learning that may be applied comprise but are not limited to: assumption determination processing; generative modeling; low-density separation processing and graph-based method processing, among other examples. Non-limiting examples of reinforcement learning that may be applied comprise but are not limited to: value-based processing; policy-based processing; and model-based processing, among other examples. Furthermore, a component for implementation of trained AI processing may be configured to apply a ranker to generate relevance scoring to assist with any processing determinations with respect to any relevance analysis, such as that described herein (e.g., in connection with assessing a fidelity score or otherwise assessing relevance of particular activities or touches). Scoring for relevance (or importance) ranking may be based on individual relevance scoring metrics described herein or an aggregation of said scoring metrics. In some examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

Further, aspects may integrate ML/AI modeling to correlate large volume of data in a contextually relevant manner. This can be used not only for generation (and adaptation) of fidelity scoring but also generation of decision points (e.g., alerting, access control) as well as generation of data insights/suggestions, reporting, generation of knowledge base.

In addition to broad applicability, approaches according to the present disclosure can be implemented as a scalable solution (e.g., a solution for a company in several different use cases are built (such as department-specific or user group-specific) to more effectively manage security environment(s)).

While the following discussion refers to certain examples in the form of systems, features and/or methods, such discussion is for providing merely an exemplary context to help explain such aspects, and the present disclosure is not necessarily so limited. The examples and specific applications disclosed herein may be implemented in connection with one or more aspects, examples (or example embodiments) and/or implementations, whether such aspects are considered alone or in combination with one another.

A particular embodiment is directed to a method implemented via data-processor computing circuitry, as follows. A persistent fidelity score is generated for a user entity, in which the fidelity score concerns characteristics associated with the user entity. The score is generated based on activity of the user entity over a time period that includes an initial time period during which the user entity is selectively granted access a computer-based system based on the persistent fidelity score, and that further includes an ensuing time period during which the user entity continues to access the computer-based system. During the ensuing time period, the persistent fidelity score is updated based on further activity information corresponding to the user entity. Continued access to the computer-based system by the user entity is selectively granted or denied in response to the updated persistent fidelity score being within a threshold tolerance and based on said characteristics associated with the user entity.

Selectively granting or denying continued access to the computer-based system may be carried out in a variety of manners. In some embodiments, this includes assessing a type of access to be provided to the user entity relative to a security characteristic associated with the type of access, and setting the threshold tolerance based on the assessed type of access. In another embodiment, the threshold tolerance is ascertained based on security level characteristics of the type of the request for access. In certain embodiments, previously-granted access for the user entity is terminated in response to changes in the persistent fidelity score.

Generating and/or updating the persistent fidelity score may be carried out in various manners, such as based on user activity, such as touch points, history, frequency of user access, time of user access, delay time between access requests, types of accesses that the user is carrying out (behavior—for instance accessing multiple bank websites), etc. For instance, the persistent fidelity score may be updated by tracking activities of the user entity and updating the persistent fidelity score based on the tracked activities. A plurality of persistent fidelity scores may be generated and updated respectively for a plurality of user entities including said user entity, and the persistent fidelity scores may be displayed In certain embodiments, alerts pertaining to changes in the persistent fidelity scores may be generated.

Respective scores may be generated for a plurality of user entities including said user entity, and implemented accordingly. For instance, data that characterizes a security metric may be maintained for each of the plurality of user entities, wherein updating the persistent fidelity score includes updating the persistent fidelity score for one of the user entities in response to changes affecting the security metric for the one of the user entities. Metrics may involve credit score, internal activity (e.g., user is demoted, terminated), change in status of an embedded electronic device from which access is requested (e.g., how secure is access to the device by others) etc. The threshold tolerance may be set based on the type of access for which the threshold tolerance is being set (e.g., lower threshold for low-security access, higher for high-security access), and applied to access requests by disparate ones of the user entities. Interactions between the user entities and predefined interaction points may be monitored, and the persistent fidelity score may be updated for each user entity in response to the user entity interacting with one or more of the predefined interaction points. One or more sets of the predefined interaction points may further be grouped, in which the score is updated based on the user entity interactions with two or more of the predefined interaction points grouped in the set.

The threshold tolerance may be set in a variety of manners. For instance, the tolerance maybe set based on external activity information corresponding to the type of access selectively granted to the user entity. For instance the threshold value may be increased when cyberattacks are detected or predicted, based on current events/threat level. Threshold tolerances may be set for a plurality of disparate types of accesses, and the threshold tolerances may be updated during the ensuing time period based on conditions relating to each of the disparate types of accesses. In such an approach, selectively granting or denying continued access to the computer-based system may include selectively granting access via one of the disparate types of accesses using the updated threshold tolerance for the one of the disparate types of accesses.

In certain embodiments, a plurality of different types of security artifacts is weighted, in which each artifact corresponds to respective activities of the user entity. The steps of generating and updating the persistent fidelity score include applying the weighting to ones of the security artifacts corresponding to activities that the user entity has carried out. The weights applied to each of the plurality of different types of security artifacts may be dynamically changed in response to contextual changes involving aspects selected from the group of: rules defined for a particular user entity, rules defined for a particular type of access to the computer-based system, user entity location, user entity history, and a combination thereof.

Another embodiment is directed to an apparatus comprising communications circuitry to communicate with a plurality of endpoint devices that provide interaction for user entities and access to a computer-based system, and one or more processing circuits that operate as follows. For each user entity, a persistent fidelity score concerning characteristics associated with the user entity is generated based on activity of the user entity over a time period. This time period includes an initial time period during which the user entity is selectively granted access the computer-based system based on the persistent fidelity score, and an ensuing time period during which the user entity continues to access the computer-based system. During the ensuing time period, the persistent fidelity score is updated based on further activity information corresponding to the user entity. Continued access to the computer-based system by the user entity is selectively granted or denied in response to the updated persistent fidelity score being within a threshold tolerance and based on said characteristics associated with the user entity.

In some implementations, the one or more processing circuits selectively grants or denies the continued access to the computer-based system by assessing a type of access to be provided to the user entity relative to a security characteristic associated with the type of access, and setting the threshold tolerance based on the assessed type of access. The one or more processing circuits may update the persistent fidelity score by tracking activities of the user entity and update the persistent fidelity score based on the tracked activities. Further, the one or more processing circuits may maintain data that characterizes a security metric for each of the user entities, and updates the persistent fidelity score in response to changes affecting the security metric for the user entity to which access is selectively granted.

Figure 1B:
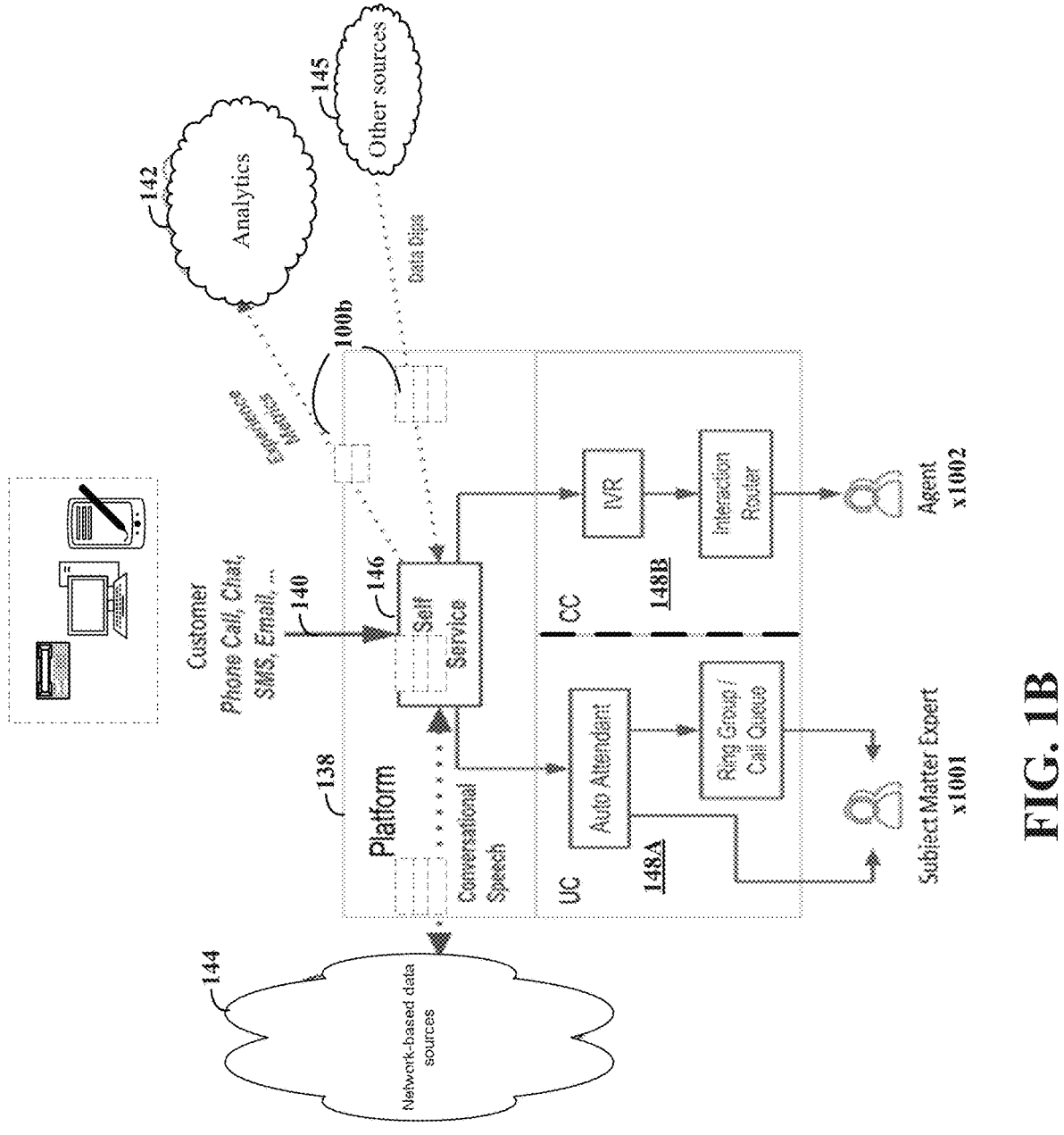
FIG. 1B illustrates another example data-communications system which is related to the system shown in FIG. 1A.
Figure 1C:
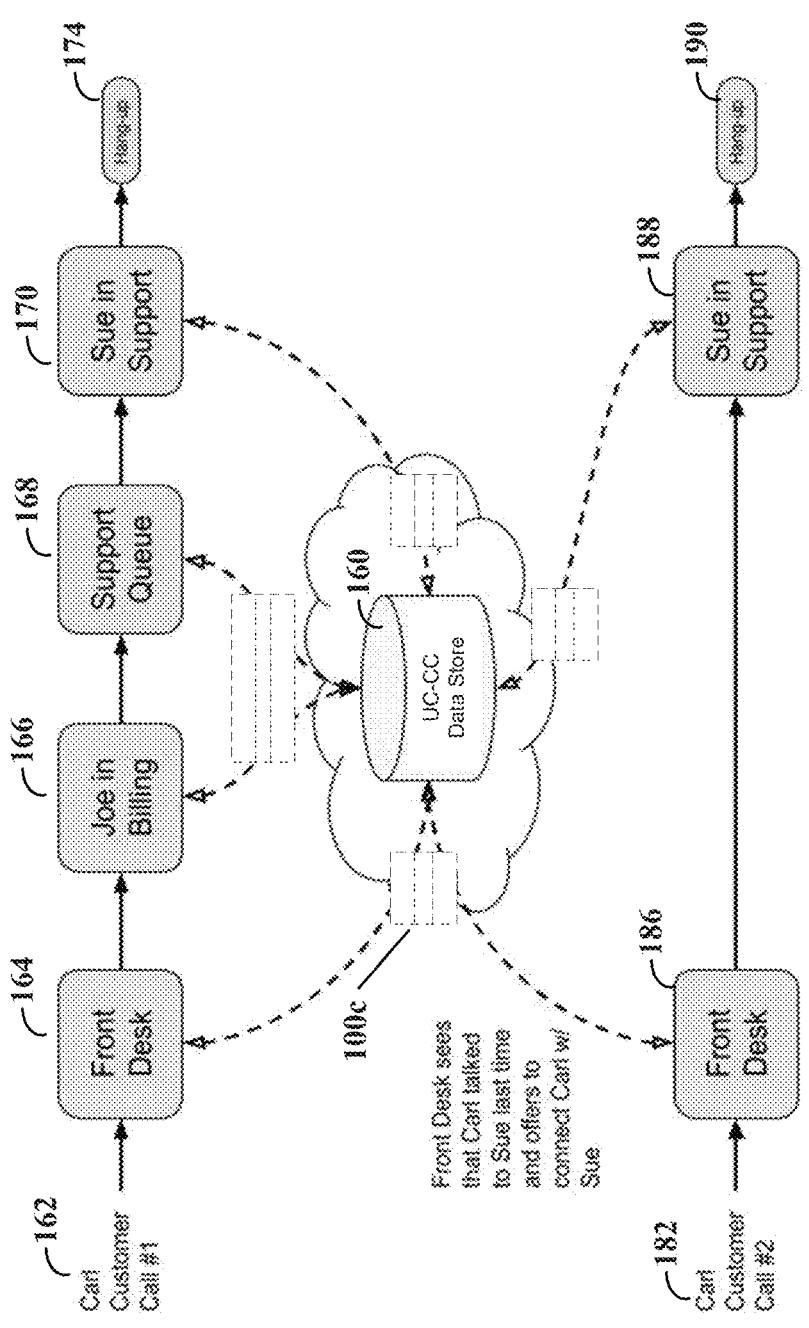
FIG. 1C is an example data-flow diagram that may be implemented by one or more of the communications system depicted through FIGS. 1A and 1B.
Figure 2:
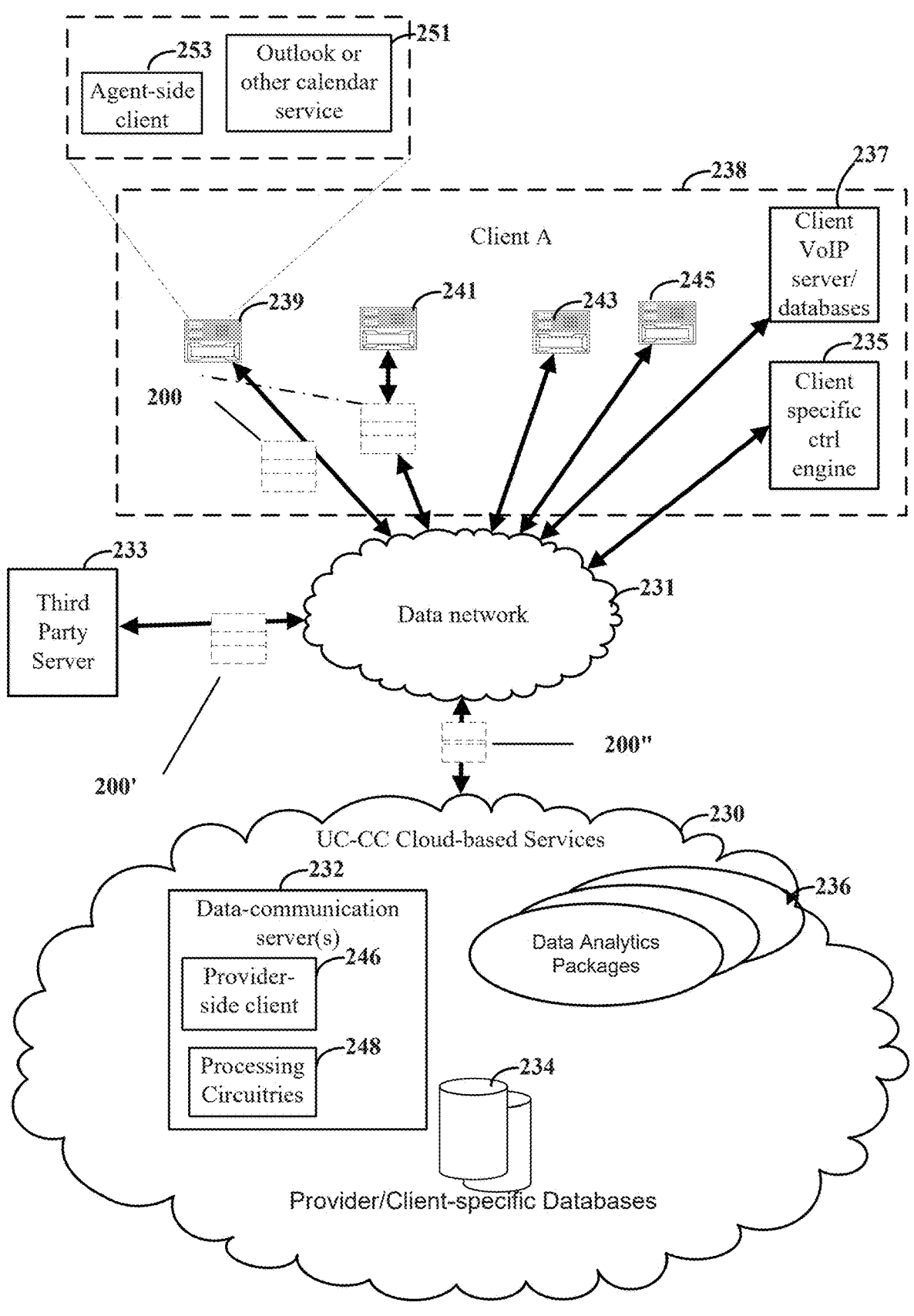
FIG. 2 illustrates another example data-communications system having aspects that may be implemented in accordance with the present disclosure.

Turning now to the Figures, FIG. 1A illustrates an example data-communications system; FIG. 1B illustrates another example data-communications system which is related to the system shown in FIG. 1A; FIG. 1C is an example data-flow diagram that may be implemented by one or more of the communications system depicted through FIGS. 1A and 1B; and FIG. 2 illustrates another example data-communications system having aspects consistent with each of the above-illustrated example embodiments of the present disclosure.

One or more of the aspects, systems, methods, etc., characterized herein may be used by adapting an existing system such as shown in the following FIGS. 1A, 1B and 1C, and in FIG. 2. These figures are presented to depict certain example implementations (e.g., corresponding to that disclosed in one or more U.S. Patents assigned to the assignee of the present disclosure), according to the present disclosure, in which one of more of the above-described aspects may be implemented and used. In each such illustrated example, a data communications server system provides data-communications services including, as examples, VoIP, virtual office features (e.g., communications) via a contact-center such as exemplified by the assignee of the present disclosure (8×8, Inc. as indicated at www.8×8.com) and as characterized in one or more of the figures included as part of the present disclosure).

As may be apparent, external access to the data-communications system (whether the system at large, or one of the system's pieces such as its server(s), databases, computer-processing circuitry, etc.) is dynamically checked so as to maintain ongoing validation that the access and/or user (effecting/attempting the data access effort) is appropriate. Such approaches may involve generating and updating a persistent fidelity score for user entities accessing the system, as characterized herein. For instance, a persistent fidelity score concerning characteristics associated with a user entity accessing data/systems (e.g., 101) from an endpoint device such as 118 may be maintained by generating the fidelity score and subsequently updating the fidelity score based on activity of the user entity over a time period during which the user entity accesses the data/systems. The fidelity score generation and updating can be carried out at analytics circuitry 102, and used to selectively grant or deny continued access to the data/systems during the time period, in response to the updated fidelity score being within a threshold tolerance and based on the characteristics associated with the user entity.

To illustrate one of more of the above-described aspects, each of FIGS. 1A, 1B and 1C includes a block in dashed lines in the data-communications pathway between the external node (e.g., data-processing-computer circuit sometimes including IP-communications enabled circuitry) or a point of (attempted) data access in the data-communications system. For example, in FIG. 1A, such a block is depicted in multiple instances in each of FIGS. 1A, 1B and 1C, respectively as 100*a*, 100*b* and 100*c* (and in FIG. 2, as 200, 200' and 200"). In each such figure, the circuit-based blocks appears in more than one instance but it is appreciated that the one or more of these circuit-based blocks may be implemented and where multiple are implemented, such circuit-based blocks may be implemented as separate blocks or as one or more integrated/structurally-unified blocks; and one or more of these circuit-based blocks may be managed/controlled substantially independently a stand-alone (master) circuit or as a functionally-dependent (slave) circuit which is subservient to control of another circuit (e.g., circuitry as part of a user interface, one or more servers, etc.).

In connection with the following FIGS. 1A, 1B and 1C, various aspects described above may be recognized as corresponding to the above-described aspects including, as just some of many examples: from FIG. 1A, service-provider data servers corresponding to 110, databases corresponding to 101, 112 and 121, broadband network(s) corresponding to each cloud such as 118, and AI/ML engine(s) corresponding to analytics circuitry 102; and from FIG. 1B, AI/ML engine(s) corresponding to analytics circuitry 142 which may be part of the data-provider system platform and/or circuitry operated on behalf of a third party (e.g., big-data services company), a live receptionist-based and/or automated client-specific call center as corresponding to one or both of 148A and 148B (the latter operating in an integrated manner). It will also be appreciated that aggregating data and different contexts of such data, as described in connection with these figures, may be part of the above-discussed data augmentation and development of the database(s).

FIG. 1A illustrates one such example data-communications system in block diagram form and consistent with certain of the above-related examples and aspects of the present disclosure. As shown in FIG. 1A, the data-communications system includes a data-communications server 110 configured to provide data communication services, including data communications such as VoIP calls and other types of interactions (e.g., text, chat, email, etc.), for a plurality of endpoint devices 118, 120, 122, 124, 126, 128 connected in one or more data networks 114, 116. In more specific embodiments, the data-communications server 110 includes an arrangement of coordinated servers such as one or more VoIP communications servers that provide VoIP communications and one or more other types of communications servers that provide such other forms of data communications service(s). Although FIG. 1A illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which are typically wireless transceivers with user interfaces (graphic user interfaces, audible, etc.). For purposes of facilitating discussion, various specific embodiments are herein directed to methods and apparatuses that include the data-communications server 110 and processing circuitry 106 in one or more of the above-noted variety of forms. Although the processing circuitry 106 is illustrated as a component of the data-communications server 110, embodiments are not so limited and the processing circuitry can form part of or be separate from the data-communications server 110.

The endpoint devices are circuit-based instruments that may be used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. Endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with aspects of the present disclosure. One or more of the clients can have client servers and/or databases 121 used to implement a variety of different services.

Accordingly, the endpoint devices are data-communications circuits which may be remotely located relative to the data-communications server 110 and may be respectively associated with remotely-situated client entities. In certain but not all embodiments, the data-communications system may include the remotely-located data-communications circuits, and in some instances one or more of the endpoint devices correspond to and/or includes a computer or a smartphone (e.g., mobile phone or tablet) to function as a softphone by running application software; and/or a computer or a smartphone to operate natively within a web browser (e.g., using webRTC) and in turn the web browser is to run on a computer or a smartphone.

The system may include one or more processing circuits configured to implement client-specific control engines 112, which are configured to adjust the data-communications provided for each client account according to a respective set of control directives. For instance, the client-specific control engines 112 can adjust routing of an incoming interaction (e.g., a VoIP-type data or text communication) to or from a client account by generating client-specific sets of control data to the data-communications server 110.

In certain embodiments, the client-specific control engines 112 are implemented in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client including, for example, database circuit 101 which may include a database manager such as the above-described type. Similarly, the control directives can be stored locally within the client-specific control engines, or stored remotely (e.g., in a centralized database, in a database maintained by the client or a combination thereof). In certain specific examples, the database manager circuit (or database 101) refers to or includes a relational database management system (RDMS) which stores data securely and returns the data in response to requests from other applications, as implemented by a database management server, and which can temporarily store data in cache 105.

In one specific example, the form of the system shown in FIG. 1A includes the data-communications server 110 configured as a unified-communications and call center (UC-CC) platform that processes incoming data-communication interactions including different types of digitally-represented communications (e.g., text, chat, email, etc.). The platform is integrated with a memory (database) circuit 101 (optionally with cache memory 105 for quick access to high-priority calls or calls requiring relatively significant analysis and processing). The memory circuit includes database having a plurality or a plethora of information sets. Each of the information sets includes user/client-entity contact information and/or experience data corresponding to past incoming data-communication interactions processed by the platform, and with the information sets being populated via an aggregation of organized data based on data collected in previous incoming interactions. The platform regularly accesses the database to assess the incoming interactions and may use past incoming interactions along with information collected via other data sources (e.g., internal to the system such as AI/ML modeled data and/or $3^{rd}$ party information). By analyzing the incoming interactions and accessing possible associations relative to the information sets in the memory circuit 101; the platform is able to facilitate an automated self-service experience for users by resolving inquiries discerned through the incoming interactions and/or effecting call-decision routing of incoming interactions to call-center agents or specialists.

Such automated self-service experiences provided via the data-communications server 110 of FIG. 1A may be realized by the processing circuitry 106 including various circuits (e.g., servers, software-directed aspects of CPU(s), logic circuitries, etc.) such as having analytics circuitry 102 to analyze an incoming interaction relative to content in the database 101 and/or to AI/ML models (not shown in FIG. 1A), having decision-routing circuitry 103 for deciding whether and/or how an incoming interaction should be routed, and in certain more specific examples or applications also having feedback circuitry 104. In specific embodiments, the data-communications server 110 may use the analytics circuitry 102 to analyze an incoming interaction by capturing and analyzing digital voice data from spoken conversations in connection with incoming interactions such as between agents of a client entity and customers. The spoken conversations may be transcribed from audio to digital voice data by the data-communications server 110, the endpoint device of the agent via a client on the endpoint device, and/or client data-communications server. The transcription of the spoken audio words to digital voice data can occur via a variety of methods. By discerning the contact information and/or other content (e.g., context of call and/or the transcription), the decision-routing circuitry 103 can access the information sets so as to check for associations and, if certain associations relevant to the current (e.g., live) call, the call may be routed as indicated by an associated one of the information sets, by user/client-entity profile settings stored with or linked to the associated one of the information sets, and/or based on a metric indicating sufficient confidence that the routing the call to a specific designation (e.g., to an expert such as a specialist having been training or otherwise having special knowledge regarding topic discerned from the call, or to an agent/manager who is assigned to the topic or incoming interaction), and each such decision may be discerned by accessing and analyzing the information sets.

Further aspects and example (optional) responsibilities of these circuitries 102, 103 and 104 are discussed further below, for example, in connection with related examples such as an example block diagram shown in FIG. 1B, an example application shown in FIG. 1C, and in connection with example manners in which incoming interactions (calls) may flow as in the other example systems disclosed herein.

In various embodiments, the data-communications system can also track a variety of information, parameters and/or metrics related to calls (i.e., incoming interactions) made or received by the agents of a client entity via processing circuitry 106 that is communicatively coupled to the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, which can show timing of the current voice data being played. The timeline can allow the reviewer to navigate within the call by selecting portions of the timeline to change what the reviewer is listening to. Additionally, the agent and the customer can have different waveforms for efficient reviewing. In other embodiments, other types of analysis are used, as further described herein.

In a number of embodiments, a particular client can customize the metrics that are to be tracked such as by the server 110 of FIG. 1A. Such customization can include the type of metrics, values given, and/or particular phrases or statements for complying with the metric (e.g., a specific call opening). For example, the customization can include definitions of performance expectations and scores, as well as performance thresholds for various metrics.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

As previously described, client-specific control engines can be used to facilitate adjustment of a variety of remote services including, for example, data-communication services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services can be provided, for example, by a cloud computing network having one or more servers configurable for a plurality of clients.

As may be appreciated, audio from an incoming interaction (e.g., incoming VoIP and/or video call) can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to test, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424, 935, filed Jul. 31, 2000, entitled "Two-way Speech Recognition and Dialect System," each of which are fully incorporated by reference for their teachings.

As illustrated in FIG. 1A, the data-communications server 110 interfaces with a plurality of remotely-situated client entities and includes or is otherwise in communication with processing circuitry 106. The processing circuitry 106 can receive digital voice data indicative of transcribed audio conversations between a plurality of agents and customers of a remotely-situated client entity and identify keywords and speech characteristic parameters from the digital voice data. In specific embodiments, the data-communications server 110 captures the digital voice data via a client on the agent side which may be communicating with a web client contact center and a client on the server side (e.g., a provider-side client as a circuit-based module inside the server 110) and provides the digital voice data to the processing circuitry 106. In other embodiments, the agent-side client communicates the digital voice data to the provider-side client. The provider-side client then provides the digital voice data to the analytics circuitry 102 for identification of keywords and/or speech characteristic parameters. The identification can include analyzing the digital voice data for matches to keywords and speech characteristic parameters stored in an archive and/or database 101.

As may be stored in the various information sets of the database 101, keywords and/or speech characteristic parameters can be associated with outcomes, in some embodiments. Example outcomes can include sale, no sale, positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 102, using the provider-side database 101, can identify a speech characteristic parameter which is outside of a threshold value (e.g., indicating an issue or potential problem), and which can correspond to or be indicative of a tone or sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific speaker or agent. For example, if the speaker or agent's speech is faster and louder than their baseline, the speech may be indicative of an issue in the conversation. Further, for certain of certain of the endpoint devices identified in the information sets and/or by way of the content of the incoming interactions being associated with certain conditional actions, the server 110 may predict or load the cache in anticipation of such speech and the call may be routed to a manager or other designated handler (e.g. other agent) better prepare to handle the call.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein based on a tone/sentiment and/or keywords. In the following discussion, various implementations and applications are disclosed to provide an understanding of the instant disclosure by way of non-limiting example embodiments exemplified by way of VoIP-type data communications which typically involve a data-communication server communicating with an endpoint device, such as a VoIP-enabled endpoint device ("VoIP device") via a broadband network (e.g., Internet, WiFi, cellular) to connect with the data-communication server that is managed by an VoIP provider such as 8×8, Inc. and/or an Internet Service Provider (ISP) such as Yahoo or Google. Through such a server, call routing and other data communications services are managed for the endpoint device.

Users of a data-communications system can use a plurality of communication services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio conversations across the entity (or across many entities) to improve subsequent interactions with the client or professional. For example, as a particular agent of an entity is conversing vocally with a client, the spoken conversation is captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client contact center (e.g., via virtual access via the Internet), and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communication services provided by the data-communications server. The analysis can include identifying keywords and speech characteristic parameters from the digital voice data, which can be, alone or together, indicative of a tone or a sentiment of a conversation (e.g., is the conversation going well or not). Example speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

The identified keywords and speech characteristics can be associated with outcomes of the transcribed audio conversation. The associations can be provided in an archive stored on a memory circuit and which can be updated over time. In various embodiments, the outcome can be determined based on the keywords and/or metadata in the digital voice data. For example, the processing circuitry can identify the keywords and compare them to previously-identified associations of keywords and outcomes. As a specific example, an entity can initially set-up an archive to include associated words and phrases that indicate a sale has occurred, a subscription is continued, a customer hangs up prior to a sale, etc. Alternatively and/or additionally, the archive can include thresholds for speech characteristics parameters that are indicative of different tones or sentiments. The thresholds can indicate or otherwise be associated with a positive conversation, a negative conversation, and changes in threshold indicating a change from a positive to negative or negative to positive conversation. Such thresholds can adjust over time based on feedback into the system and corrections by agents. For example, prior to storing an outcome as associated with a keyword and/or speech characteristics parameter, the outcome and the association can be provided to the agent and/or to a manager for review and approval. In response to an input verifying the outcome, the association is stored. In response to an input correcting the outcome, the associated is not store or a revised outcome is associated with the speech characteristics parameter and stored.

The analysis of the digital voice data can be used for training purposes. For example, a particular agent is provided feedback after the call on what keywords to avoid and/or strategies for the next call. More specifically, the feedback can include providing the association(s) to the client data-communications server and/or to the endpoint device of the agent. In a number of specific embodiments, the feedback or training can be provided in real time or near-real time during the audio conversation. For example, the agent, via an endpoint device (e.g., a computer or otherwise) can be provided a display or audio that cannot be heard by the customer, that indicates keywords to avoid, keywords to use, and/or directs the user to change their speech pattern (e.g., slow your speech down, take a deep breath). In some specific embodiments, specific keywords, alone or in combination with specific speech characteristic parameters, can cause an auto-trigger for connecting a manager to the audio conversation. For example, another endpoint device that is used by the manager can be bridged to the data communication, such as a VoIP call. The data-communications server can access a database to identify the manager and information for connecting the manager into the audio conversation. In this way, a manager can be bridged into a call without additional action by the agent. In some instances, different customers can have different keywords or speech characteristic parameters that trigger the connection with the manager. These keywords or speech characteristic parameters can be based on previous audio conversations with the customer, identification of a category of customer (e.g., important customer that is ranked 10 on a scale of 1-10), among other analytics.

In various embodiments, the processing circuitry and/or the data-communications server operated by the data-communications provider or a client side server can analyze the associations over a period of time, and generate a report indicating different outcomes and associated keywords and/or speech characteristics parameters. Such reports can be used for training purposes and can also be used to identify different patterns. For example, customers from different geographic regions can interact similarly or differently from one another. As previously described, specific keywords or tones can indicate different outcomes based on geographic regions, markets, type of customer, etc. The data-communications server and/or processing circuitry (which may be optionally integrated with this server) can provide assessment of a quality of calls based on the analysis, and provide feedback to the entity. The feedback can be used for training, which can be provided in real time during the call or after.

In some specific embodiments, the analytics can be provided as a service by the data-communication (e.g., VoIP) provider. For example, the analytics can identify keywords and/or tones/sentiments that result in positive outcomes, and also keywords that provide faster outcomes. Additionally, the metrics used to assess the outcome and/or the quality of the call can adjust over time. The adjustment can be responsive to additional digital voice data, and/or verification or adjustment by the agents or a manager to ensure the determined outcomes are correct. In a more specific example, the feedback can be provided by identifying customer-interaction metrics in the digital voice data. In some embodiments, the associations can be locked and a manager reviews the recommended adjustments (by the agent) and approves or denies the adjustment. The customer-interaction metrics include values or ratings of an interaction of an agent with a customer. For example, the customer-interaction metrics can include different ratings which can be impacted by the use or non-use of specific keywords, phrases and speech characteristic parameters.

The processing circuitry can analyze the data over time and across a plurality of agents. For example, particular agents can be identified for an entity that have customer-interaction metrics outside a threshold value. Such agents, for example, can be provided feedback, as described above, for training purposes. The feedback can include identification of customer-interaction metrics to adjust for potentially better outcomes or specific outcomes (e.g., a sale or customer retention). In some instances, the feedback is provided in real time and/or during the conversation, such as recommended phrases to the say to the customer and/or recommended adjustments in the agent's tone. The customer-interaction metrics can be tracked over time and/or adjusted using digital voice data of additional audio conversation.

Another form of an example data-communications system is shown in FIG. 1, which bears similar aspects as the system depicted in FIG. 1A. The example system of FIG. 1B also includes a data-communications server 138 configured as a unified-communications and call center (UC-CC) platform, which is shown receiving different types which include the types of incoming interactions via one or more network channels at 140 similar to as discussed with FIG. 1A, and also incoming interactions associated with the server 138 engaging in conversational speech and with other data sources at via connections to other circuit-communicative endpoints through a broadband network (e.g., cloud-based). This pathway is shown connecting to external audio/video-communication-enabled equipment such as CPUs, smartphones, robots, etc.

An analytics (CPU) processor circuit 142 and other database/source circuitries 144 are shown being integrated with the server 138 but separated by pathways via one or more broadband connections. The analytics processor circuit 142 may be use as directly corresponding to the analytics circuitry 102 of FIG. 1A, or alternatively the server 138 may have the analytics circuitry internal (not shown in FIG. 1B) and the analytics processor circuit 142 may be used selectively by the server 138 to complement the data and associations of the information sets stored in the analytics circuitry internal to the server 138. The other database/source circuitries 144 permit the server 138 to be connected to other sources of information including, as examples, AI/ML resource services which may be trained via data fed by the server 138, customer systems, $3^{rd}$ party servers (e.g., Lexis and Westlaw (online research), Salesforce™, Microsoft Dynamics, and other applications for business, research, etc.

The server 138, as shown with conceptual (not physical separation of) responsibilities at 148A and 148B, processes each of these different types of interactions via an integrated memory (e.g., the database circuit 101 of FIG. 1A) for access to information sets which may have user/client-entity contact information and/or experience data corresponding to past incoming data-communication interactions processed by the UC-CC platform. The server platform receives and initially processes an incoming interaction via channel 140 so that an initial step of analysis may be performed. This initial step of analysis, which again may be performed conceptually on one or both the UC and CC sides, may involve for example, security authorization, gate-way passing and/or handing off the incoming interaction to another module within the server or outside the server for further analysis such as the analytics processor circuit 142.

The vertical dashed line is used to show separation of responsibilities of the server conceptualized via UC side 148A and CC side 148B of the server platform; however, in certain example embodiments of the instant disclosure these UC-side and CC-side responsibilities may be actually implemented via physical/logical integration in various ways including the following specific examples performed by the platform/processing circuit to provide an integrated secure-access environment and being performed as only one or a combination of one or more of the following. First, a high-level security-based firewall circuit for accessing one or more of the circuitries 101, 142 and/or 144 with secondary/tertiary level checks before granting accesses. Second, access to one or more of the circuitries 101, 142 and/or 144 being granted with the access pathway implemented as an internal bussing structure controlled by a database manager internal to the UC-CC platform, so as to control access requests to/from the platform. Third, granting such accesses while prohibiting traversal of any broadband gateway circuit and/or of any security-based firewall circuit. Fourth, granting such accesses so long as data provided from one or more of the circuitries 101, 142 and/or 144 so long as data provided from any one or more of the circuitry or circuitries 101, 142 and/or 144 occurs via a single access-based request-and-receive-data transaction, for example, a "single dip" transaction, involving only one of the circuitries 101, 142 and/or 144. Fifth, a limited number of such access-based request-and-receive-data transactions, for example, a "double dip" involving two transactions to any one of the circuitries and/or involving two transactions to two of the circuitries 101, 142 and/or 144 (or alternatively, a "triple dip" involving three transactions collectively to two or to three of the circuitries 101, 142 and/or 144). Sixth, granting such accesses while prohibiting (or exclusively permitting certain types of) data from being provided over any or one or more particular broadband networks, any or one or more particular gateways, and/or any or one or more particular security-based firewall circuits. Again, two or more these examples may be used in combination, for example, with the sixth example being used with fourth or fifth example.

Next, the incoming interaction may be processed by circuit-based modules which traditionally are more closely associated with only one of the UC and CC sides. For example, as depicted in FIG. 1B at the UC side, activities may involve functionality auto-attendant operations and/or a ring-group/call-queue operations to permit incoming callers to access experts/specialists (e.g., subject matter expert) having special knowledge concerning the nature, purpose or context of the incoming interaction as discerned by the analytics processing of the incoming interaction and/or as indicated by answers from the initiator (e.g., caller) of the incoming transaction to automated subject-based hierarchical queries from the server back to the initiator. The server/processing circuit may route such a particular incoming interaction to a discerned one of various possible selected experts (or specialists) having a high likelihood of being able to address the issue of the incoming transaction. In more specific example embodiments, the server/processing circuit may decide at which point to route the incoming transaction to such an expert or specialist (via real or virtual system extension x1001) based on a confidence level, relative to a fixed or variable threshold, that the discerned issue has been more than likely recognized as matching the knowledge category/categories of the expert or specialist. Moreover, the threshold and/or the manner in which the issue is discerned may be based on the server/processing cCircuit assessing data from, as examples: information set(s) accessed in the database (e.g., 101 of FIG. 1A); analytics circuitries/modules (which may or may not include AI/ML models) whether internal to the data-communications system and/or external via a broadband and gateway to/from the system (e.g., via analytics processor and/or other database/source circuitries 142, 144 of FIG. 1).

At the CC side, activities may involve interactive voice recognition (IVR) operations to permit incoming callers to access information automatically via a voice response system of prerecorded messages without having to speak to an agent, and/or use menu-driven options to have their calls routed to specific departments or specialists, with or without similar confidence assessment as described above in connection with the server/processing_circuit assessing data from the above-noted examples (e.g., via 101 of FIG. 1A and/or 142, 144 of FIG. 1). As depicted at the bottom of FIG. 1B, the server/processing_circuit may route the incoming transaction to an agent, for example, via real or virtual system-based extension x1002, selected through the system's service-provided IVR experience.

Accordingly, with the example embodiment of the system shown in FIG. 1A, the related system depicted in FIG. 1B is able to facilitate an automated self-service experience for users by resolving inquiries discerned through the incoming interactions and/or effecting call-decision routing of incoming interactions to call-center agents or specialists, and this may be achieved by analyzing the incoming interactions and accessing possible associations relative to the information sets in the database, and/or other sources of information (and optionally, analysis).

In more specific examples and according to other aspects of the present disclosure, the UC-CC platform may process the incoming interactions in various ways and while making use of different resources (e.g., depending on the services linked to the respective incoming interactions and depending on aspects related to the call itself). The following explains some of these more specific examples, each of which is according to aspects of the present disclosure.

In connection with one such example aspect, the UC-CC platform is to read from the database to assess whether a selected one of the incoming interactions has source identification information associated with archived database information for indicating whether the selected one of the incoming interactions is to be routed, terminated or processed according to special instructions, and the UC-CC platform may write to the database to augment the database with information discerned from the inbound communication based on the source identification information and/or content deciphered from the inbound communication.

With regards to other example aspects, the UC-CC platform is to respond to a selected one of the incoming interactions: by iteratively accessing the database to assess for whether the selected one of the incoming interactions has archived associations stored therein and to augment the database with new associations generated in response to analyzing content from the selected one of the incoming interactions; and by, in sequence, assessing from the database whether the selected one of the incoming interactions has archived associations stored therein; assessing whether there is sufficient information in the database for the selected one of the incoming interactions to be routed, terminated or processed according to special instructions. Further, the UC-CC platform is to pursue may pursue at least one additional resource, according to client-specific profile data in the database, in attempt to gain more information for the selected one of the incoming interactions to be routed, terminated or processed specially based on said more information. The additional resource(s) may include a series of queries fed back to the initiator of the selected one of the incoming interactions, and wherein in response to the initiator answering one or more of the series of queries, the UC-CC platform augments the database with new associations generated in response the initiator answering one or more of the series of queries and/or trains AI/ML (artificial intelligence and/or machine learning) models to be use in processing subsequent incoming interactions.

In connection with yet further aspects, the UC-CC platform may respond to a selected one of the incoming interactions by performing an analysis on whether source information and/or content data warrants augmenting the database with newly-generated associations, and also may perform the analysis based on one or more confidence thresholds, corresponding to metrics or parameters provided by client entities, which indicate likelihoods that the newly-generated associations have sufficiently-high integrity.

In a more specific example, the UC-CC platform includes a computer-based database manager for managing access (reads, writes, refreshes, cache management, etc.) to the database which may be formed of different regions of memory circuitry and/or different memory circuits. In this context, database manager may act as an interface to various modules (e.g., programmed circuits) in the data-communication system which are to request access to the database for a selected one of the incoming interactions. As an example for use of the database manager in an integrated secure-access environment, the UC-CC platform accesses the database through an access pathway in which the database manager resides to respond to access requests from the UC-CC platform. In more specific examples of this type, the access pathway is situated so that access to the database does not traverse any broadband gateway circuit and does not traverse any security-based firewall circuit, and alternatively for permitting access over the broadband network while limiting exposure to unauthorized accesses, the access pathway is situated so that access to the database does not traverse more than one broadband gateway circuit and does not traverse more than one security-based firewall circuit.

In another related yet more-specific example, the UC-CC platform of one or more of the above data-communications systems accesses information regarding designated call-center agents and specialists which are stored in the database, and then routes the incoming interactions to the agents and/or specialists as may be appropriate given the particular details of the incoming interaction which are discerned by the UC-CC platform. In this regard, the UC-CC platform may also access the archived associations in the database for deciding whether to route respective ones of the incoming interactions to one or more of the designated call-center agents or one or more of the specialists having specific knowledge of subject matter discerned through the incoming interactions.

In certain situations, after a respective one of the incoming interactions is routed to a receiving party, whether one or more agents, one or more specialists or another party, the UC-CC platform may permit the initiating/receiving party of the incoming interaction to select a bridging option for causing a selected party to be bridged and joined into the incoming interaction and this bridging could be to anywhere inside or outside the system or client entity related to the incoming interaction. Further, in response to the selected party being bridged and joined into the current (e.g., live) incoming interaction, the UC-CC platform may archive information to associate the call and the bridging into the database for use in a subsequent one of the incoming interactions. Also, according to another aspect which may optionally be part of the automated self-service experience, the UC-CC platform may access the database for the subsequent one of the incoming interactions and in response to finding corresponding parameters for the incoming interaction, may cause the subsequent one of the incoming interactions to automatically bridge, or offer as an option to bridge, one or more agents and/or one or more specialists into the subsequent one of the incoming interactions.

As other aspects related to the above data-communications systems, the UC-CC platform may access the database for content in a selected one of the incoming interactions which content indicates whether to bridge a manager affiliated with an account, into the selected one of the incoming interactions. The affiliated manager may be identified by source information for the selected one of the incoming interactions and/or by associations stored in the database. Also, the UC-CC platform may bridge to such a manager into the selected one of the incoming interactions in response to discerning one or more of: keywords, context, intonation, and speech characteristics, and the UC-CC platform may discern, in response to the accessing of the database for a selected one of the incoming interactions, whether to offer an entity affiliated with the selected one of the incoming interactions, one or more data-communications services and/or data analytics packages through which the user or affiliated client entity might gain access to metrics, outcomes and certain AI/ML models which are part of or being generated by the system. The database may also include representations of digital voice data associated with transcribed audio conversations which correspond to one or more of the incoming interactions, and may further include geographic information and/or calendar information provided by or associated with the one or more of the incoming interactions, wherein the representations of digital voice data include keywords and speech characteristic parameters associated with outcomes of or with contexts relating to the transcribed audio conversations.

In another example aspect, the UC-CC platform may affect the call-decision routing of the incoming interactions to the above-mentioned designated call-center agents or specialists based on a time-based assessment of whether the designated call-center agents or specialists are able to handle the routing of the incoming interactions. Such assessments of whether the designated call-center agents or specialists are able to handle the routing of the incoming interactions may be performed by predictive analysis, models and related system data.

Depending on the application, it will be appreciated that the UC-CC platform can be implemented to include a cloud-based set of data/call centers, at least one of which includes a plurality of data-communications servers respectively located in different physical locations, and that the UC-CC platform can include physically-separated virtual servers and/or circuit-based modules that are configured to work together so that they collectively function as a single unified server having integrated read and write access to the database without having to pass through a gateway of $3^{rd}$ party entity (e.g., which is disparately managed relative to the service provider on behalf of the UC-CC platform). Also, such physically-separated virtual servers and/or circuit-based modules of the UC-CC platform may be configured and integrated for access to the database without having to pass through disparately-managed security-screening filters.

In accordance with the present disclosure, FIG. 1C provides a simple example of how an incoming interaction may be processed via a generalized data-flow diagram. The data-flow diagram shows one of many ways for how such an incoming interaction may be received and processed by one or more of the above-disclosed example data-communications systems (e.g., the UC-CC platform of FIG. 1A or FIG. 1). FIG. 1C shows two processing pathways respectively illustrating what happens through two incoming interactions from the same initiator, in this example, the two incoming interactions being from Carl, a customer who calls in twice. Carl's first call starts at circuit-based block 162 and flows along a pathway including circuit-based blocks: front desk 164, billing 166, support queue 168, agent/specialist 170 and confirmation of (optionally with feedback to database 101 after) call-termination 174. Carl is transferred by the front desk 164 to Joe at billing 166. Billing 166 informs Carl that he really needs to talk to support personnel and hence, Joe at billing 166 transfers Carl into the support queue 170 where Sue answers. Sue is very helpful and resolves Carl's initial challenge involving his first call starting at block 162.

This processing of Carl's call (the first and/or second call) may or may not involve live communications with one or more humans who go by names Joe and Sue, and in the case of a human, Joe and/or Sue may be live agents or experts to which Carl's first and/or second calls may be transferred after discerning a likelihood that his/her assistance is appropriate.

Further, based on said one or a combination of two or more of the blocks 164, 166, 169 and 170, the platform (or processing circuit) generates further associations for storage in information sets as discussed in connection with FIG. 1A the data store or database with each such information set being linked, for example, to Carl via contact information for Carl), Cart's call-in device (e.g., CPU or smartphone), a client entity associated with Carl or his call-in device, and/or context discerned in connection with Carl's incoming interaction.

Continuing with this example, four months later, Carl has slept a few times and calls back in not remembering who he talked to but remembering things worked out well last time. This second call starts at circuit-based block 182 and flows along a pathway including circuit-based blocks front desk 186 (the same or different via a virtual front desk than front desk 164) and support queue 188 (the same or different via a virtual support queue than support queue 168), with block 190 corresponding to confirmation (optionally with feedback to database 101) of call-termination 174. Again, each of these blocks may or may not involve live communications with one or more humans. Accordingly, in this second call, the call from Carl is received by the front desk 186, which is prompted that "hey, the last time Carl called in, he talked to Sue, and our analysis of the call is that it went well". This may occur with access to the (e.g., analyzed via analytics circuitry in FIG. 1A or 1B). So the front desk transfers the call promptly to Sue based on an access via the front desk 186 to relevant data in the data store 160 and possibly with Sue at block 188 again accessing relevant data in the data store 160.

Accordingly, for this second call, Carl's experience and resolution of Carl's challenge is based on one or more accesses to relevant data in the data store 160 (e.g., via the associations in information sets discussed in connection with FIG. 1A in the data store or database 101) by any one or a combination of two or more of the blocks 164, 166, 169 and 170.

FIG. 2 shows yet another example data-communications system with circuit-based modules highlighted to illustrate one way for how a UC-CC platform/server via cloud-based services 230 detailed to show one or more data-communications servers 232 (having provider-side client circuits 246 and processing circuitry 248), provider/client-specific databases 234 (e.g., as being within the database 101 of FIG. 1A), and data analytics packages 236 which may be subscribed to and/or accessed by selected client entities to which the platform provides data communications services.

In connection with the specifically-illustrated example of FIG. 2, endpoint devices 239, 241, 243, 245 connected in a data network 231 are configured to place and receive VoIP telephone calls between other VoIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account 238 of a client, e.g., Client A, and include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices 239, 241, 243, 245 can include, but are not limited to, desktop computers, mobile (smart) phones, laptop computers, and tablets, such as illustrated by 240, 242, 244. When each of the endpoint devices originates or receives a call in a telephone network, each can be characterized or referred to as an addressable call endpoint or a dial peer. The client can have or be associated with one or more client databases 237 for storing various data and a client specific control engine 235.

The data (e.g., call) routing and other services for the VoIP telephone calls can be provided by one or more data-communications servers 232 within a UC-CC services system 230 which may be cloud-based as depicted in the example illustration of FIG. 2 (e.g., configured to provide a PaaS to customers of the VoIP provider). In particular example embodiments, the data-communications servers 232 can be located within platform as a service (PaaS) computing servers, which are part of the UC-CC services system 230. The UC-CC services system 230 also includes one or more provider hosted client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with embodiments, the cloud services can include session initiation protocol (SIP) servers, media servers, and servers providing other services to both VoIP endpoint devices and the users of the VoIP endpoint devices. In some instances, the various servers, including both the data-communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified UC-CC server.

A particular example of a data-communications server which uses Session Initiation Protocol (SIP) to handle various call functions (e.g., call setup and tear down); however, the various embodiments discussed herein are not necessarily limited thereto. Consistent with the above and other embodiments disclosed herein, the data-communication servers are VoIP communications servers that are configured to establish a leg of the call from the VoIP endpoint devices (or dial peers) to another VoIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server (in the UC-CC platform as with FIG. 1A) can be designed to receive digital voice data, such as directly from an agent-side client associated with particular endpoint devices. The agent-side client can communicate the audio or the digital voice data to the provider-side client. The provider-side client then provides the audio or digital voice data to processing circuitry 248 which may include analytics and decision-routing circuitries (e.g., as shown in FIG. 1A) and in certain more specific examples may include processing/ communications circuitry internal and/or external to the data-communications system for further analysis, such as transcribing to digital voice data, identifying keywords and/or speech characteristic parameters, identifying an outcome, and providing an association between the keywords and/or speech characteristic parameter using the identified outcome. The association can be stored in an archive in provider-side and/or client-specific database(s) 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a customer database 237. The feedback can be provided in real time or near real time to the endpoint device of the agent and/or can be accessed by a manager.

Additionally as another aspect of the present disclosure, in a system implementation a plurality of such UC-CC communications-service platforms (each according to one or more of the above embodiments of the present disclosure) is deployed redundantly across a mixture of private and/or public data clouds and collectively said plurality of platforms enable such UC-CC platforms to switch in real-time or near real-time (effectively instantly for purposes of a system operation from a user's perspective and/or experience) to a redundant platform in the case of any service interruption. This enables services to be provided to end customers seamlessly and/or without interruption. Accordingly, in such a system, UC-CC platforms may act as redundant subsystems with each such platform being deployed across a plurality of data networks and/or clouds to provide redundancy, and with the plurality of data networks and/or clouds being private and/or public and being configured to enable each of the UC-CC platforms to switch to another one of the UC-CC platforms for redundant real-time or near real-time operation in the case of any event indicative of a possible service interruption.

As another of many advantageous points, such UC-CC communications-service platforms according to the present disclosure are readily configurable to self-provision of software updates and integration of various virtual resources, and if used, with automatic updates of associations in the provider-side database (e.g., 101) and automated training of the AI/ML models to handle future incoming interactions with more-intelligent and increasingly improving outcomes of challenges. This is in contrast to certain known on-premise contact-center types of systems in which although characterized as being fully unified, updating the software and ensuring the integration of all systems is functional cannot readily/practicably be done often and therefore may be very challenging and unduly expensive for IT staff to accommodate and more likely prone to error.

Figure 3A:
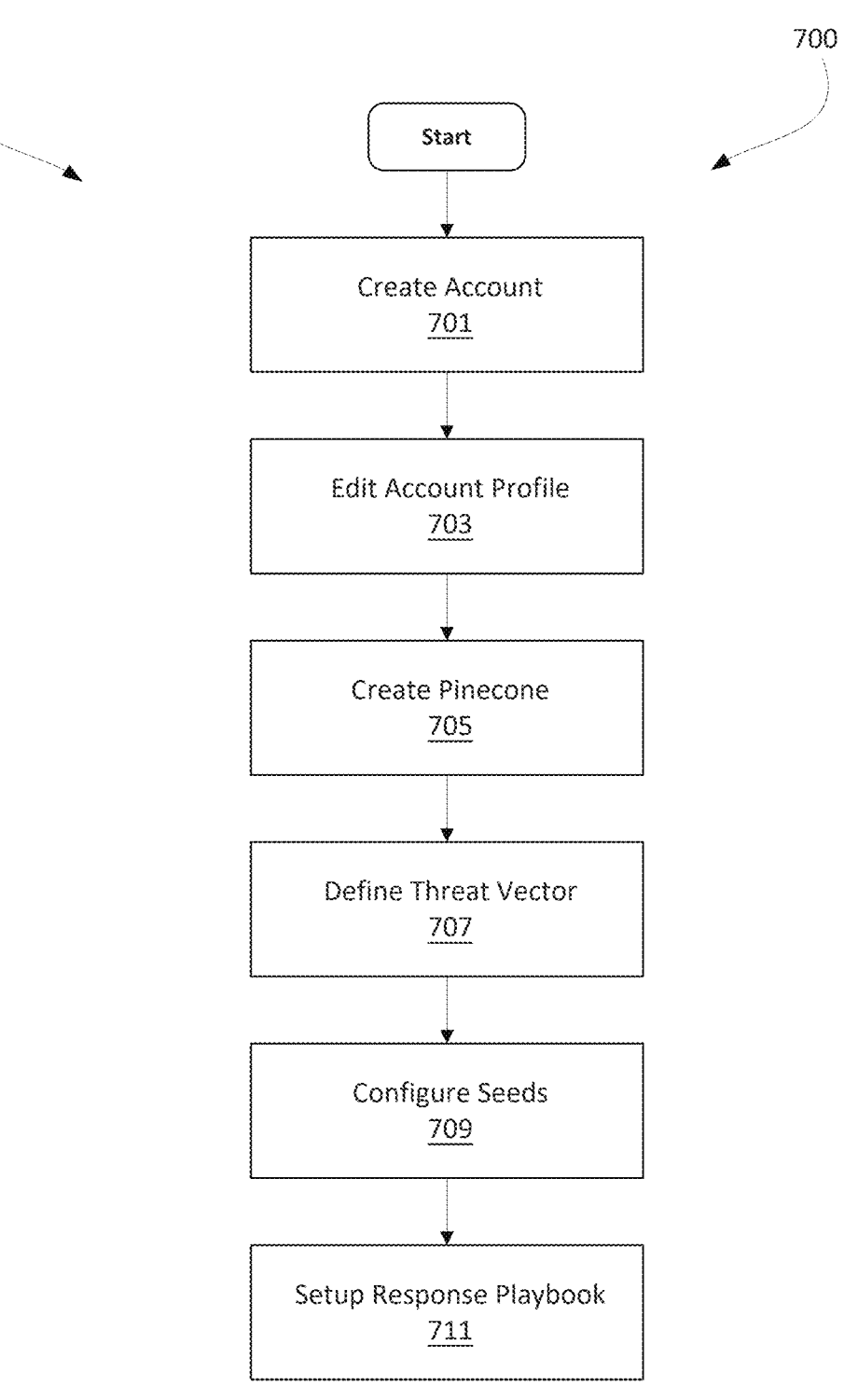
FIG. 3A depicts a flowchart diagram of a method of establishing an indicator of compromise system, as may be implemented in accordance with the present disclosure.
Figure 3B:
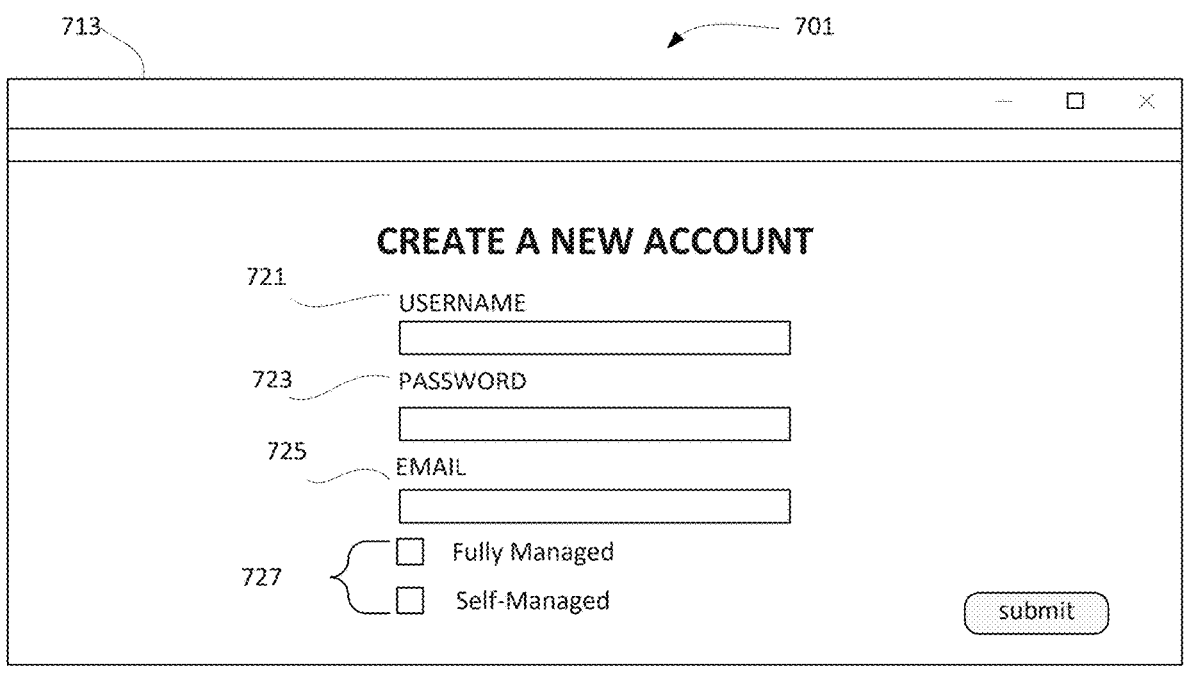
FIG. 3B depicts a GUI element representation of a module to create a user account, as may be implemented in accordance with the present disclosure.
Figure 3C:
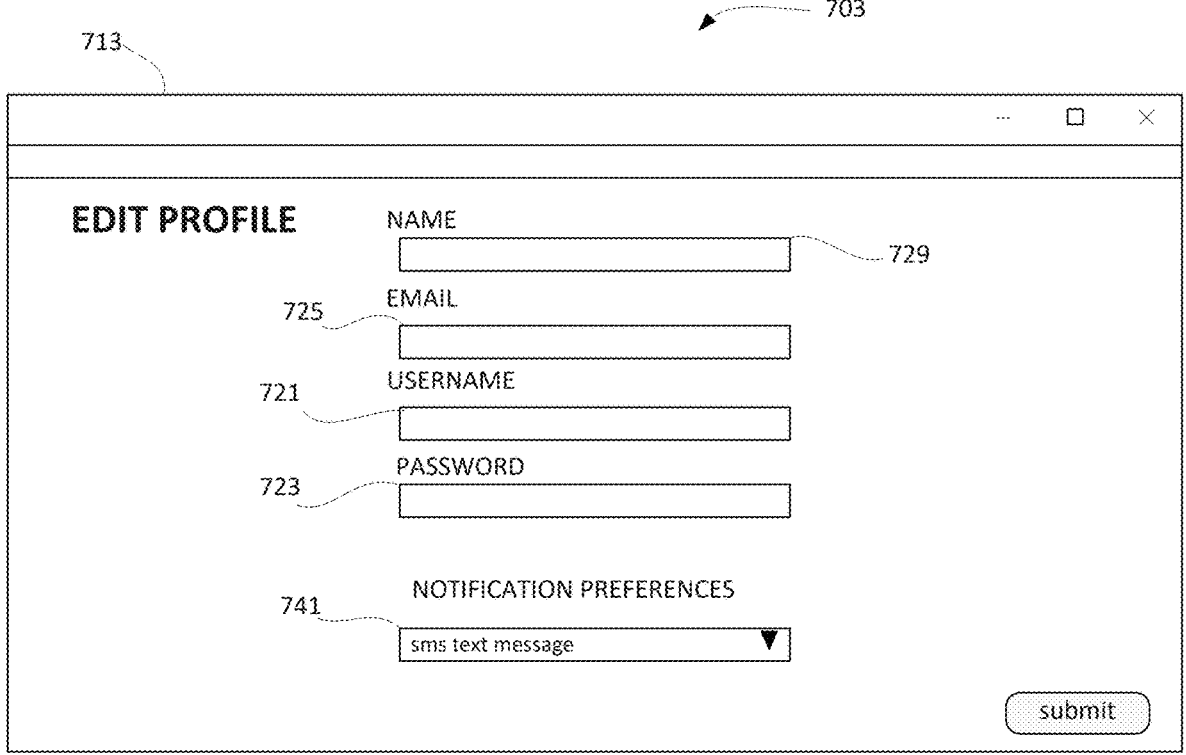
FIG. 3C depicts a GUI element representation of a module to edit an account profile, as may be implemented in accordance with the present disclosure.

Referring to FIG. 3A, a method 702 of establishing an intrusion detection system 700 is shown according to embodiments of the invention. FIGS. 3B-3J depict exemplary GUI elements 713 of the steps of method 702 for establishing indictors of compromise system 700. In such embodiments, the operations of method 702 can be included as executable program instructions that are embodied in a computer readable storage medium. In various embodiments, the method 702 depicts means for accomplishing various embodiments of the disclosure. Similarly, the GUI elements 713 of FIGS. 3B-3J depict a visualization of a computer program product that, when executed by a computer, produces a visual representation of the indicator of compromise system 700, for instance in which FIG. 3J depicts a GUI element representation of a module to configure a pinecone according to one or more embodiments of the invention.

The method 702 includes, at operation 701, the step of creating a user account on indicator of compromise system 700. Establishing an account may require input and/or selections from a user. Examples of such input and/or selections could include, but are not limited to, data such as a username 721, a password 723, an email address 725, and the like. In addition, establishing an account may require additional selections such as service level commitments 727. For example, a user might be requested to choose between fully managed services or self-managed services. In various embodiments, the method 702 includes, at operation 703, the step of configuring an account profile. In embodiments, operation 703 may include the ability to make changes or updates to user data entered in operation 701. In embodiments, operation 703 may include interfaces for a user to make additional selections and/or choices to tailor how the intrusion detection system 700 functions according the user's preferences. For example, a user might select how to receive notifications 729 from indicator of compromise system 700. Such notifications might include options such as emails, text messages, telephone calls, or the like. A user may be prompted to associate a name 729 with the account profile. In further embodiments of the invention, a user may be able to further customize notifications, as discussed in more detail below.

Figure 3D:
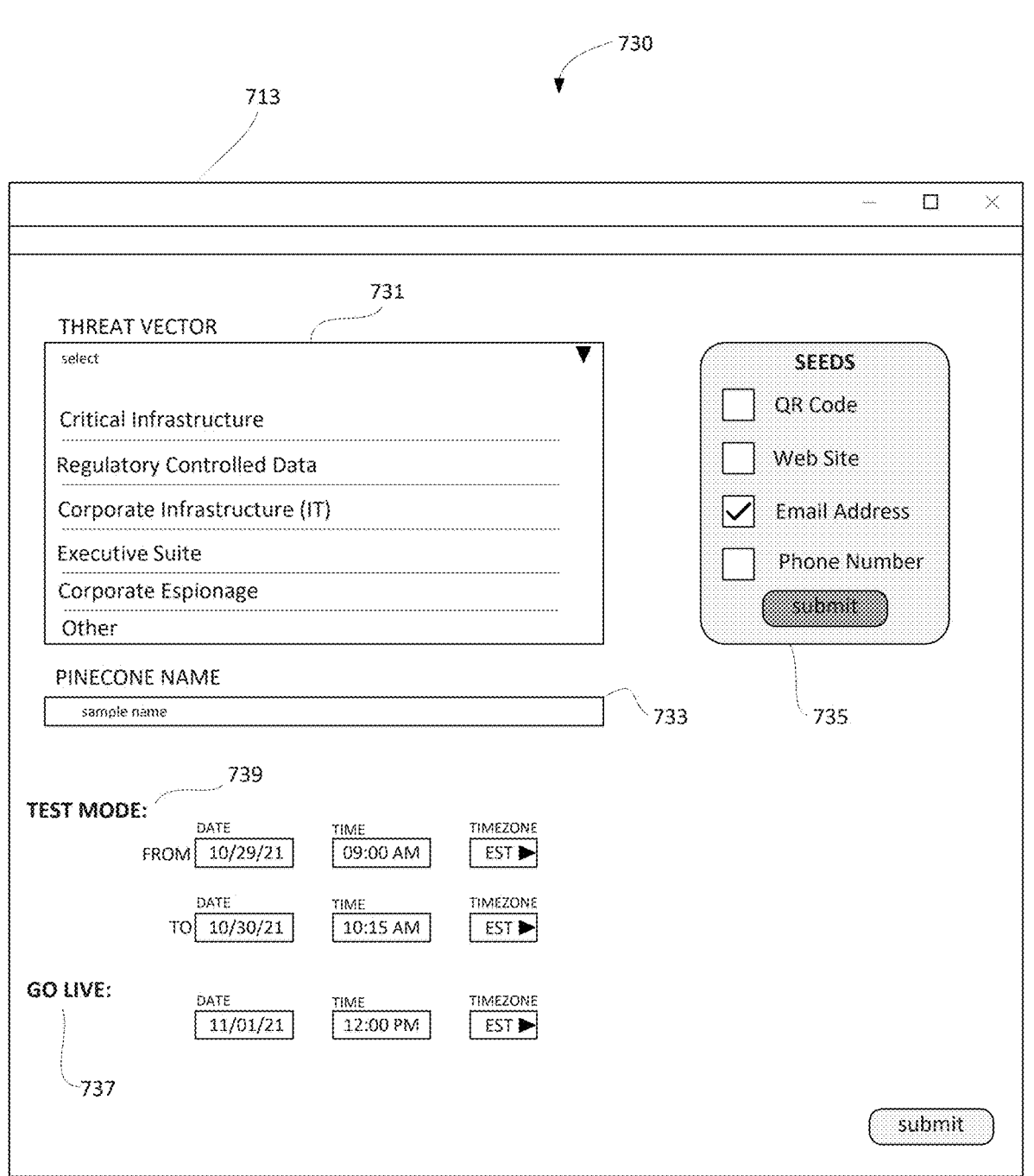
FIG. 3D depicts a GUI element representation of a module to generate a pinecone, as may be implemented in accordance with the present disclosure.

The method 702 includes, at operation 705, the step of creating a pinecone 730 and at operation 706, the step of defining a threat vector. In embodiments of the invention, some operations of method 702 may occur contemporaneously using GUI element 713. In alternative embodiments, operations of method 702 may be subdivided into additional operations that may require multiple GUI elements. Referring to FIG. 3D, GUI element 713 may include selecting a threat vector 731. In embodiments of the invention, threat vectors may be predefined. In alternative embodiments, a user may define characteristics of a threat vector. Threat vectors associate certain features of the indicator of compromise system with particular points of attack or targets. For example, an intrusion into critical network infrastructure may require several immediate actions such as alerting multiple parties, automated changing of passwords, disabling servers, taking a data center offline, or the like. Other intrusions may not require immediate attention and could be queued for review at a more convenient time. GUI element 713 further includes the ability assign a pinecone name 733, as well as one or more seeds 735 to the pinecone 730.

Pinecones 730 may be configured in advance of being placed into an operative mode 737. Pinecones 730 may further be placed into a test mode 739 that is distinguishable from an operative mode 737. In a test mode, for example, alerts may be limited to less intrusive methods such as test emails, rather than real-time or attention grabbing methods such as text messages or phone calls. In some test modes, alerting to external third parties, such as law enforcement or call centers, may be disabled. In embodiments, a test mode 739 may have a starting date and/or time, and an ending date and/or time. In embodiments, operative mode 737 may have a starting date and/or time. In embodiments, operative mode 737 may simply be enabled as soon as a pinecone is created.

Figure 3E:
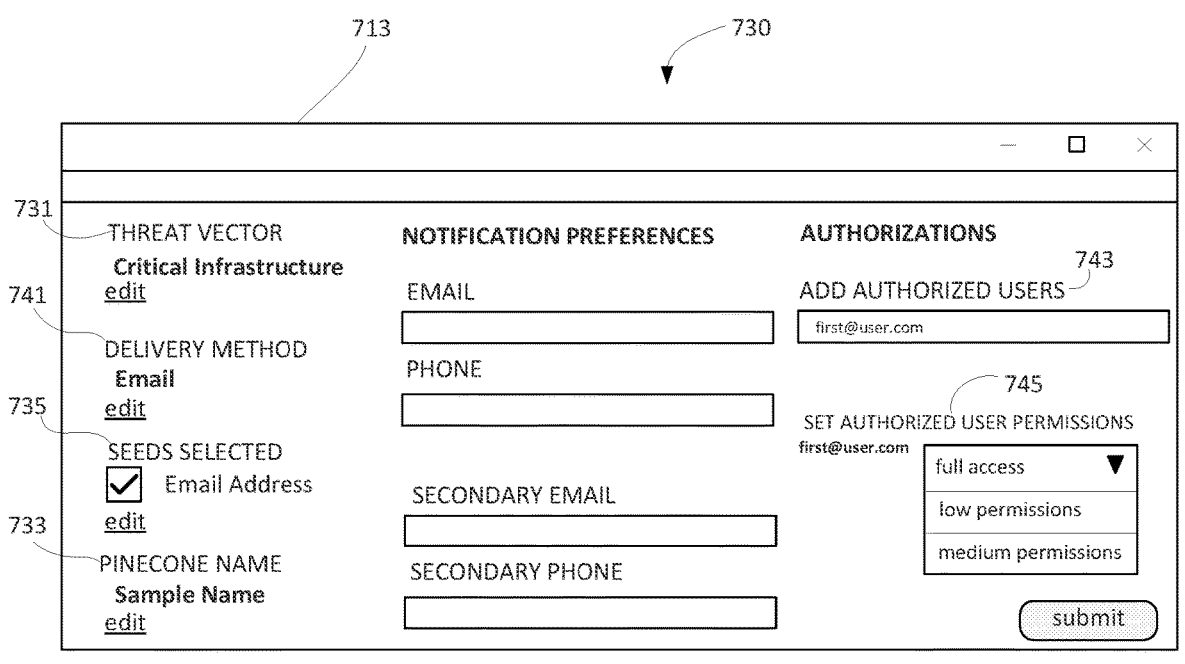
FIG. 3E depicts a GUI element representation of a module to set notification preferences, as may be implemented in accordance with the present disclosure.
Figure 3F:
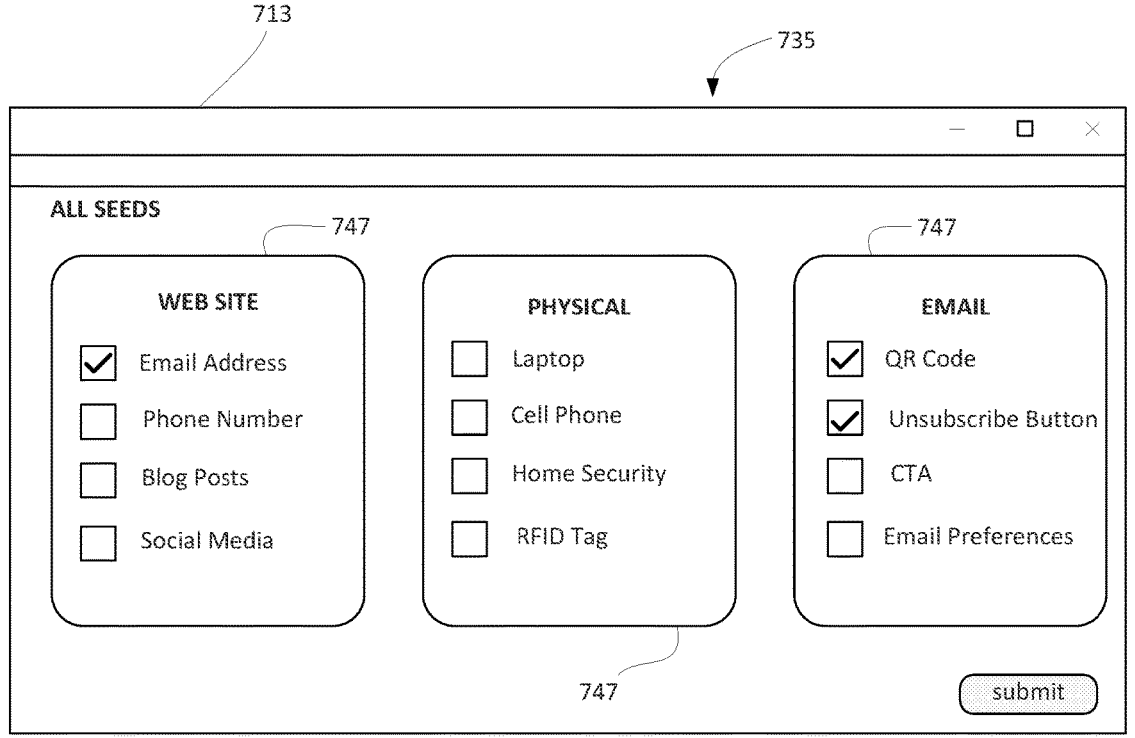

Referring to FIG. 3E, GUI element 713 may show an overview of pinecone 730. GUI element 713 may further offer the function to edit or configure pinecone options. For example, GUI element 713 may offer the function to edit threat vector 731, pinecone name 733, selected seeds 735, or notification delivery method 741. GUI element 713 may permit a user to update contact information such as an email address or a phone number. In embodiments, GUI element 713 may permit a user to add alternate contact information such as secondary, tertiary, etc., email addresses, phone numbers, or the like. In embodiments, pinecone 730 may include user based permissions allowing the operator to create and manage a list of authorized users 743. Each authorized user might have a specific set of user permissions 745 associated with said user. For example, a first user might be given full access to update a pinecone 730, whereas a second user might be permitted to only change select features of pinecone 730, such as delivery method. In embodiments, user permissions 745 may be predefined sets of permissions. In embodiments, an operator may be able to individually assign elements that a user can alter, or create customized sets of user permissions 745.

Pinecones 730 include one or more seeds 735. Seeds 735 are placed where an intruder or unauthorized user may interact with them. Seeds may include a touch point, or point of interaction between monitored elements and an intruder or an unauthorized user. Seeds may also include a trigger event that is activated when an interaction with the seed occurs. In embodiments, GUI element 713 may organize seeds 735 into categories of seeds 747, as exemplified in FIG. 3F. For example, seeds 735 may be categorized 747 into web site seeds, physical seeds, or email seeds. Additional seed categories 747 are not beyond the scope of this disclosure. For example, a category of seeds might be electronic office documents, containing electronic documents such as word processor documents, spreadsheets, and the like. Individual seed elements may be assigned to different categories. For example, a QR Code seed element could be in both a web site category as well as an email category.

Figures 3G, 3H:
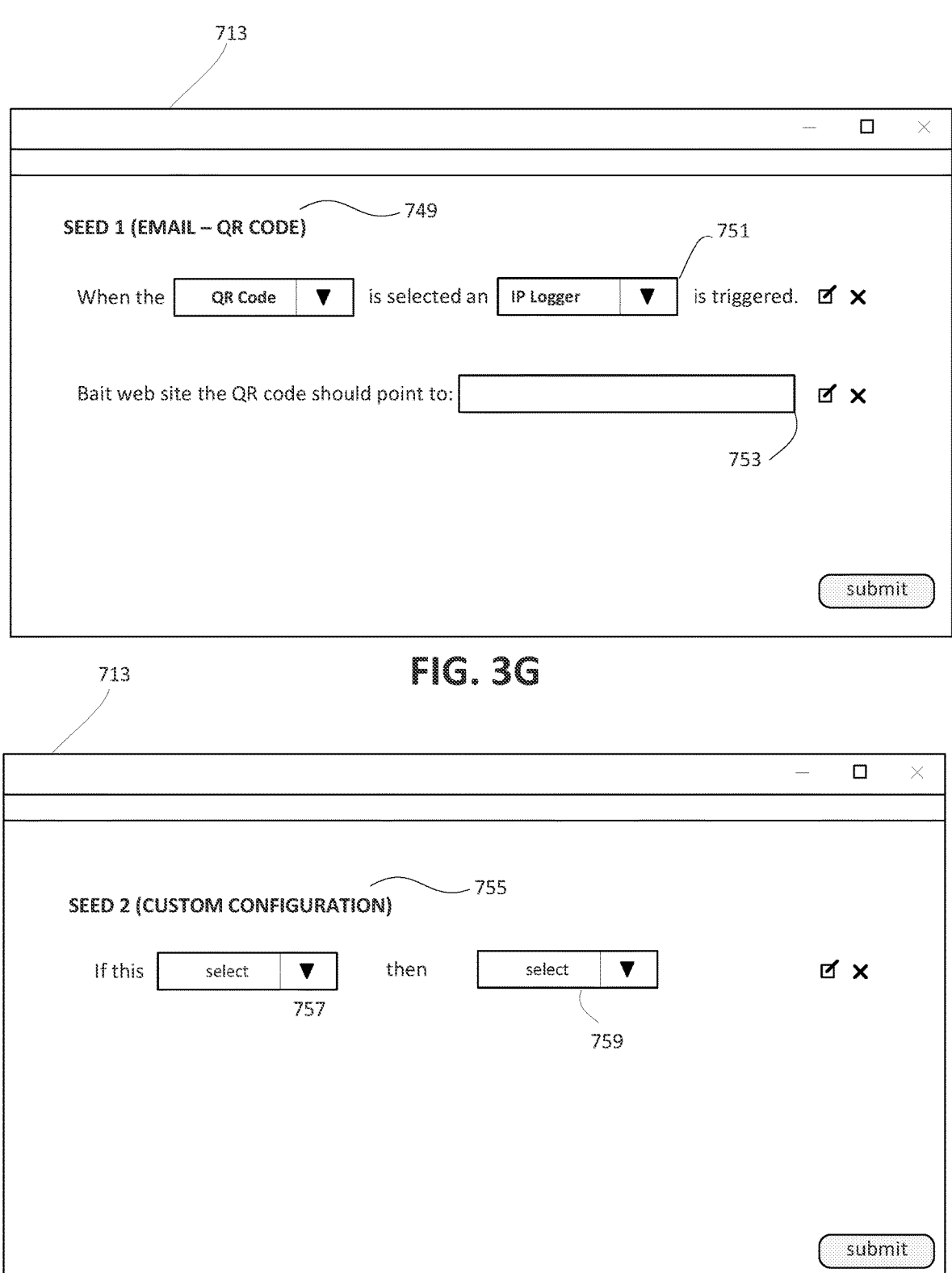

Each seed element 735 may have configuration options suited to the particular seed element type. For example, FIG. 3G illustrates an exemplary GUI element 713 for configuring a QR Code type seed 749. Such configuration may occur as part of operation 709 in method 702. In embodiments, a QR code 749 may be configured to perform some action 751 when the QR Code is triggered, such as logging the Internet Protocol (IP) address of the device that triggered QR Code 749. In embodiments, a QR Code seed 749 may be configured to direct an intruder to a bait website 753. Bait web sites may be further configured for any number of additional purposes. For example, in embodiments, a bait web site may be configured to entice an intruder to enter personally identifiable information into a web site form. In embodiments, a bait web site may be configured to place a tracker on the intruder's device. Such trackers may be, for example, a web site cookie. In embodiments, a bait web site may be configured to log additional details about an intruder, such as detailed device information, or details about the software that an intruder is using.

FIG. 3H illustrates a custom seed 755 configuration according to embodiments of the invention. In a custom configuration, a user could configure a trigger 757 and an associated action 759 to occur when the trigger 757 is activated. In embodiments, trigger 757 and action 759 may be predefined. In embodiments, a user may add additional triggers 757 and actions 757. For example, triggers 757 and actions 759 may be combinations of other elements of the system, or they may be added to the system through additional modules.

Figure 5:
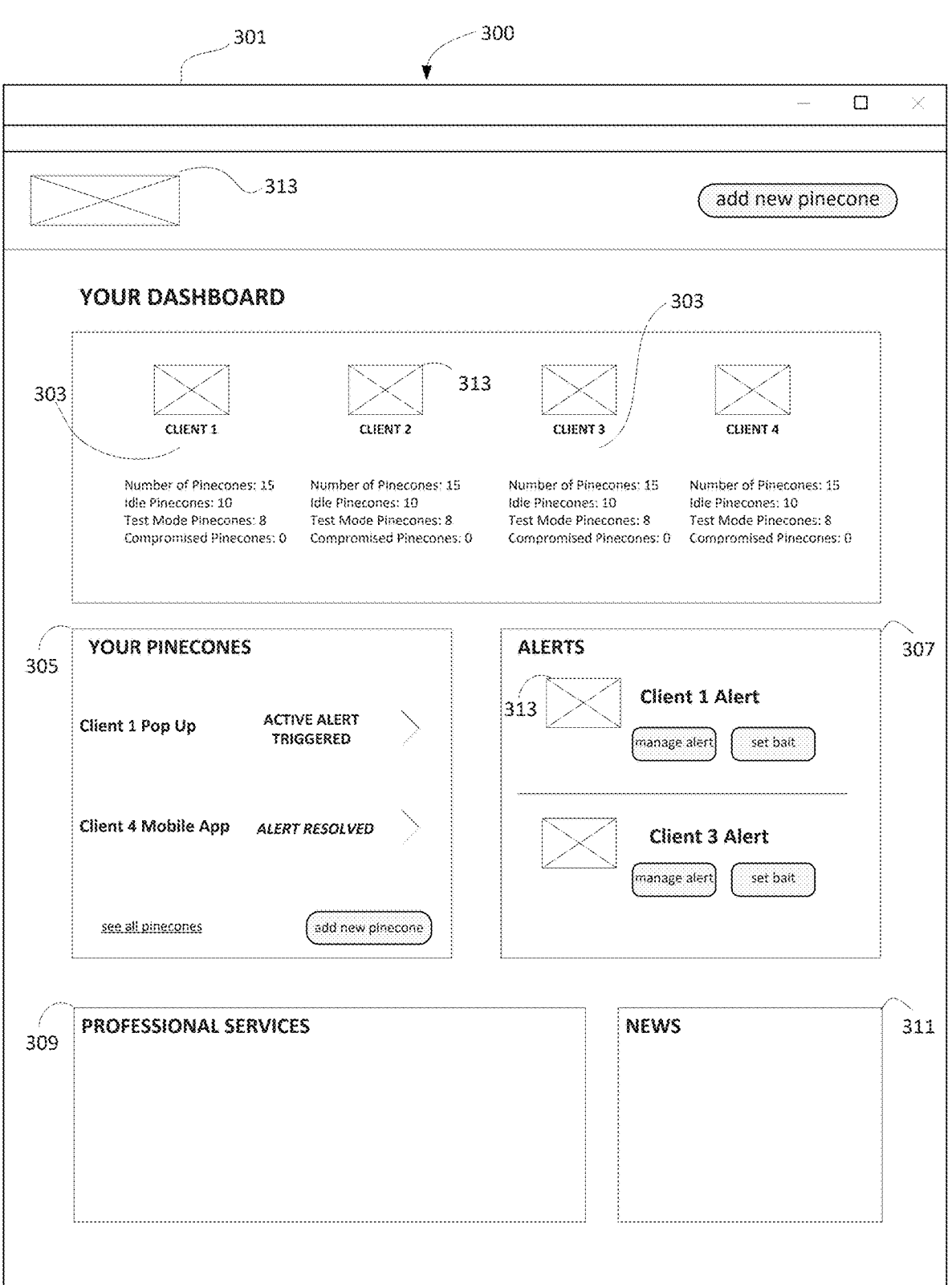
FIG. 5 depicts a GUI element representation of module to display a dashboard for an intrusion detection system, as may be implemented in accordance with the present disclosure.

The method 702 includes, at operation 711, the step of establishing up a response playbook 761 for a pinecone. GUI element 713 may be used to define a number of actions that occur in the event a seed is triggered, as illustrated in FIG. 5. A first response 763 is generated when a seed is triggered. For example, a first response 763 might be to send an email to a designated point of contact. If the first response 763 fails to reach the designated contact, a second response 765 may be generated. For example, second response 765 might be a phone call to a designated point of contact. In embodiments, the first and second designated points of contact may be the same entity, however the method of contact may differ. In embodiments, the first and second points of contact may be different entities. In embodiments, in the event the indicator of compromise system fails to reach the second point of contact, a third response 767 may be generated. For example, third response 767 may be an action taken by the indicator of compromise, such as rolling back system passwords. In the event that the third response 769 fails, a fourth response 771 may be generated. For example, fourth response 771 may be notifying a rapid response team such as a 24×7 operations center. It will be understood that these responses and associated actions are merely examples. In embodiments of the invention, response playbook 761 may have more or fewer configured responses. In embodiments of the invention, some or all responses may occur contemporaneously or sequentially. For example, a first response may be to simultaneously generate a message to a designated contact through both email and a phone call. If no response is received to either the email or phone call, the playbook may then move onto the next configured response or responses.

Figure 4:
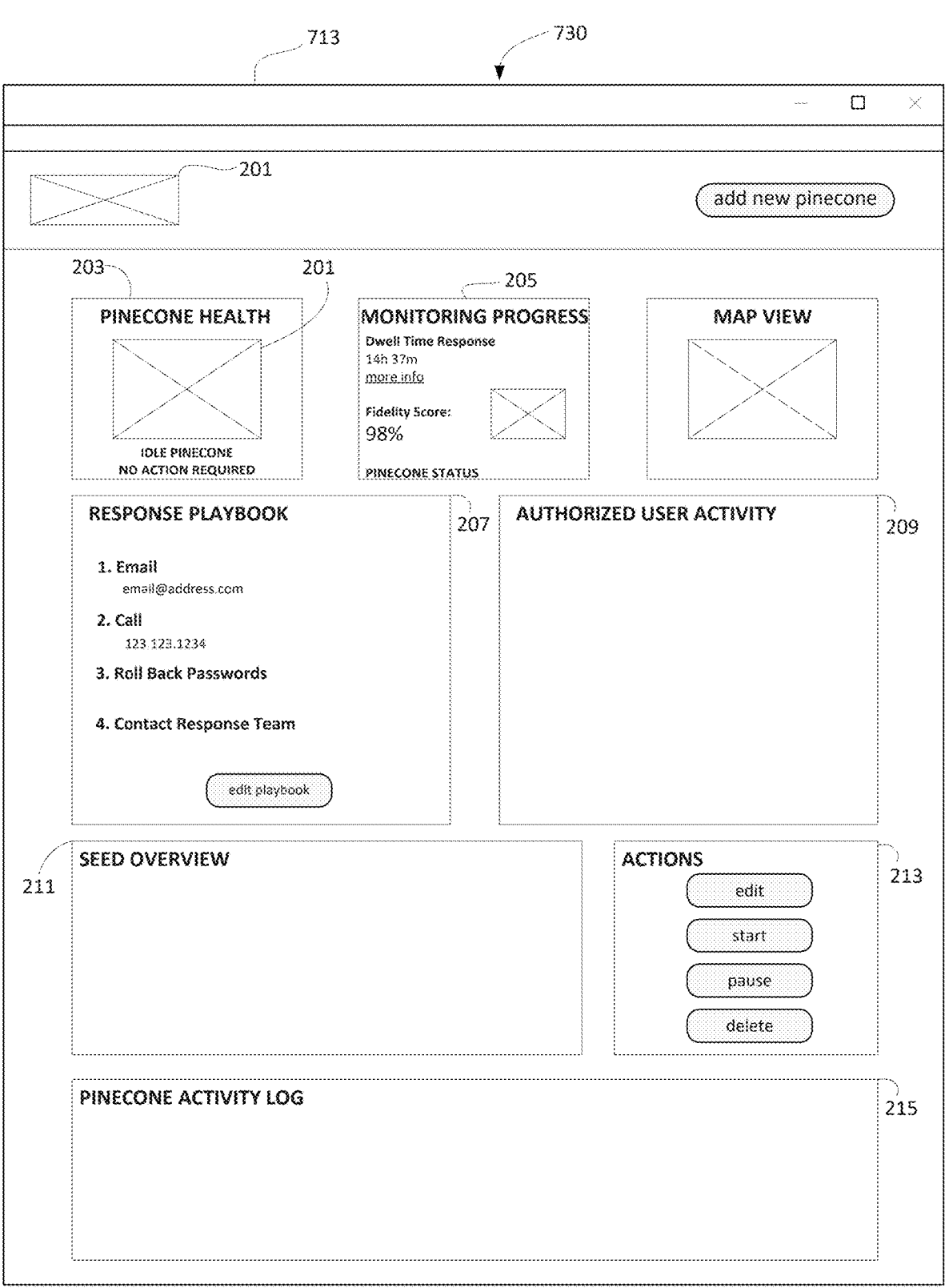
FIG. 4 depicts a GUI element representation of module to display an overview of a pinecone, as may be implemented in accordance with the present disclosure.

FIG. 4 depicts a GUI element 713 illustrating an overview of a pinecone 730. The pinecone overview GUI may include one or more graphic elements 201. In embodiments, graphic elements 201 may be logos or branding. Logo or branding elements may be user configurable such that the indicator of compromise system is a white label system, which is to say, a user can place their own logos or branding on the system and make it appear to consumers as though the user designed and/or independently operates the indicator of compromise system. In embodiments of the invention, graphic elements 201 may be graphs, charts, pie charts, maps, heat maps, or other graphical representation of data as may be useful to a user of the indicator of compromise system. An overview may include a GUI element depicting the health or status 203 of a pinecone. In embodiments, an overview may include a GUI element monitoring the progress 205 of an alert. In embodiments, an overview may include a GUI element illustrating a summary of a response playbook 207 associated with a pinecone. In embodiments, an overview may include a GUI element illustrating activities undertaken by authorized users 209 associated with a pinecone. In embodiments, an overview may include a GUI element illustrating a summary of seeds 211 associated with a pinecone. In embodiments, an overview may include a GUI element offering actions 213 that may be taken on a pinecone. Such actions 213 might include, for example, starting or deploying the pinecone, stopping or pausing the pinecone, editing the pinecone, or deleting the pinecone. In embodiments, an overview may include a GUI element illustrating an activity log 215 of a pinecone. In embodiments, logs, summaries, activities, or the like may be depicted textually, such as in ordered lists. In embodiments, logs, summaries, activities, or the like may be depicted graphically through the use of images, charts, graphs, icons, or the like.

According to embodiments of the invention, GUI element 301 may depict a dashboard 300 as illustrated in FIG. 5. A dashboard 300 may present information regarding multiple clients 303 to a user. Each client 303 represents, for example, a customer of a user. Clients 303 may each have their own pinecones associated with them. Accordingly, dashboard 300 may provide information on the number of pinecones associated with each client 303, as well as, for example, information regarding statuses of the pinecones. In embodiments, GUI element 301 may provide a pinecone summary panel 305 drawing immediate attention to particular pinecones. For example, attention may be drawn to pinecones that have an active alert or have recently had an alert resolved. In embodiments, GUI element 301 may include an alert summary panel 307. Alert summary panel 307 may provide a summary of active alerts. In embodiments, alert summary panel 307 may provide shortcuts to functions for managing active alerts. In embodiments, dashboard 300 may have additional panels 309,311 configured to show additional information such as news, additional services, contact information or the like. In embodiments, dashboard 300 may have more or fewer panels. In embodiments of the invention, a user may configure what panels are displayed and in what order on dashboard 300. In embodiments, dashboard 300 may include graphical elements 313. In embodiments, graphic elements 313 may be logos or branding. Logo or branding elements may be user configurable such that the indicator of compromise system is a white label system, which is to say, a user can place their own logos on the system and make it appears to consumers as though the user designed and/or independently operates the indicator of compromise system. In embodiments of the invention, graphic elements 313 may be graphs, charts, pie charts, maps, heat maps, or other graphical representation of data as may be useful to a user of the system. Additional dashboards, or sub dashboards, are not beyond the scope of this disclosure. For example, an alert dashboard may include panels directed towards conveying more detailed information regarding alerts to a user. Similarly, dashboards may provide more comprehensive detail regarding logs. Logs may include, for example, user activity, seed activity, alert activity, and the like, as well as all associated historical data with such activities.

Figure 6:
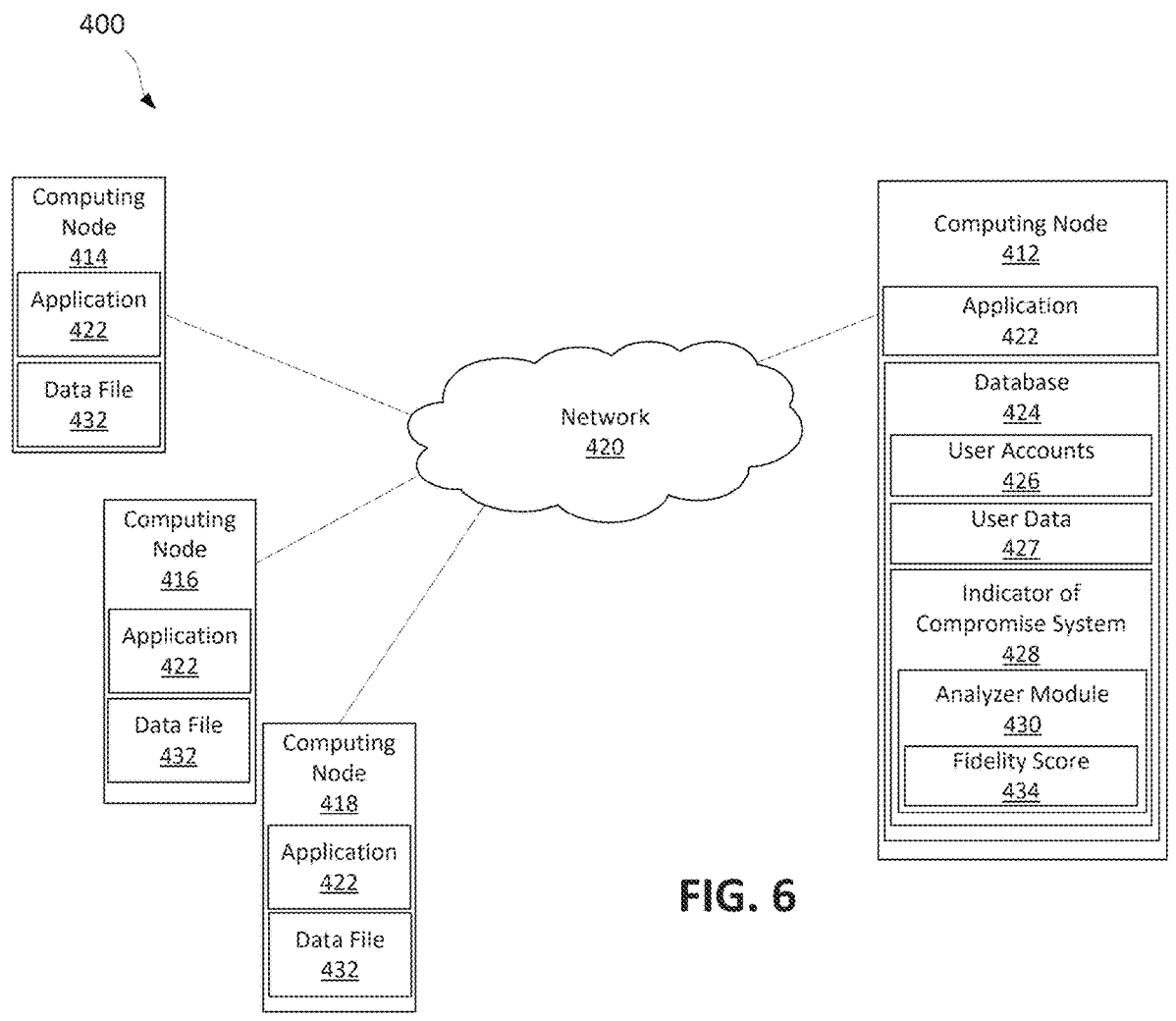
FIG. 6 depicts a network diagram for an intrusion detection system, as may be implemented in accordance with the present disclosure.
Figure 7:
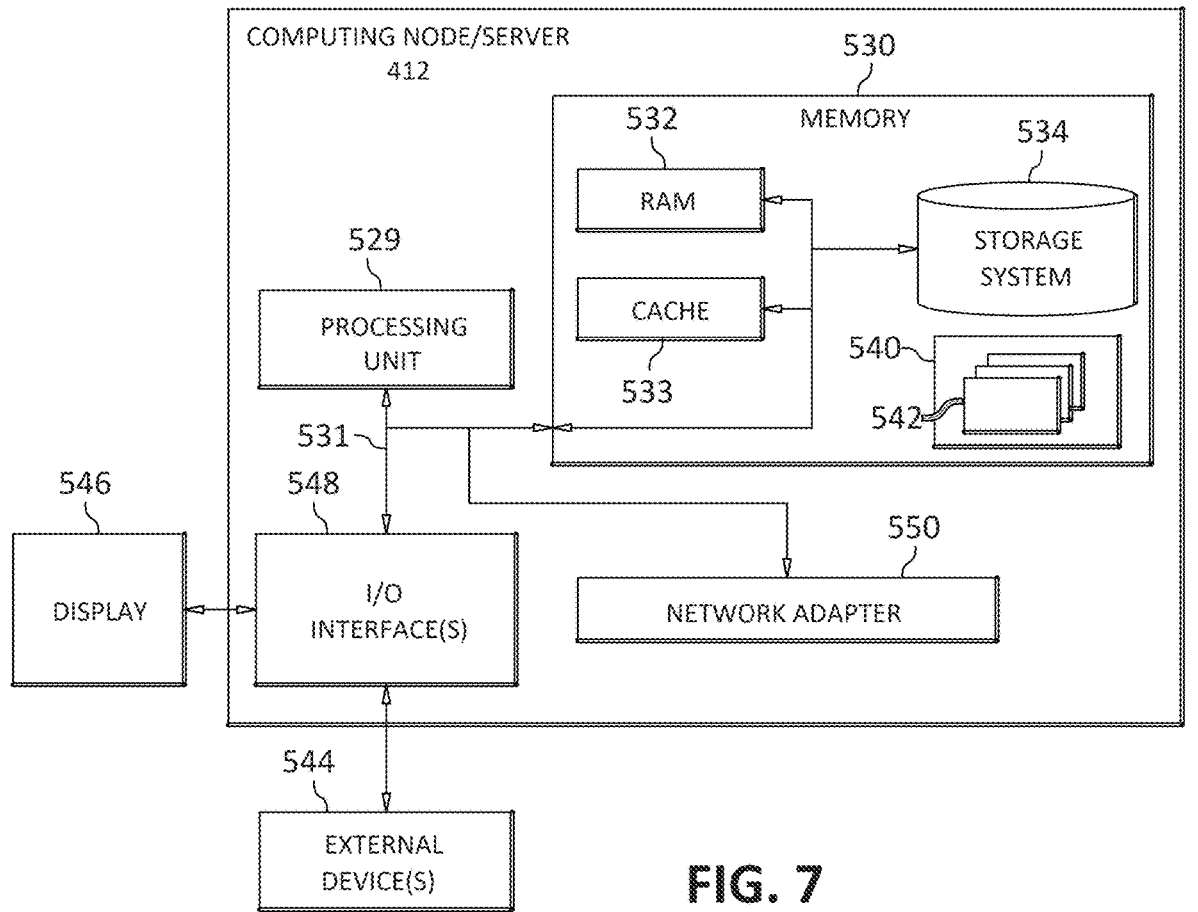
FIG. 7 depicts a block diagram of an example computing environment for use with an indicator of compromise system, as may be implemented in accordance with the present disclosure.

Referring to FIGS. 6-7, a network diagram, and a computing node in a system 400 for an indicator of compromise system is depicted, according to one or more embodiments. In one or more embodiments the system 400 includes one or more computing nodes 412-418. Computing nodes 412-418, may be physical devices, usable by a consumer or other user, including processing elements and memory. The computing nodes 412-418, include, for example, a desktop computer, laptop computer, tablet device, smart phones, wearable computing device, or other suitable device. Computing nodes 412-418, are interconnected via a network 420, for communication. In one or more embodiments, the network 420 may be, for example, a local area network, a wide area network, a cloud computing environment, a public network (e.g., the internet), or other suitable network for communication between the computing nodes 412-418.

In one or more embodiments, the system 400 outputs data and receives inputs to and from users via the computing nodes 412-418. For example, the computing nodes 412-418 may each include input/output devices, for example a display and/or touchscreen, for interfacing with a user via a graphical user interface (GUI) or other user interface. In one or more embodiments, each of the computing nodes 412-418 includes an application 422 ("App"). In some embodiments, the App 422 is a program or "software" that is stored in memory accessible by computing nodes 412-418 for execution on the computing nodes 412-418. In one or more embodiments App 422 includes a set of instructions for execution by processing elements on one or more of the computing nodes 412-418, for an indicator of compromise system, as described herein. In certain embodiments, App 422 is stored locally on some or all of the computing nodes 412-418. In some embodiments, App 422 is stored remotely, accessible to some or all of the computing nodes 412-418 via a network.

In some embodiments, computing nodes 412-418 are arranged in a client server architecture. For example, computing node 412 may be configured as a server with computing nodes 414-418 arranged as clients. For example, depicted in FIG. 7, computing node 412 is a server including database 424, and computing nodes 414-418 are clients, who use App 422 to communicate with the server to establish user accounts 426, input user data 427. In certain embodiments, clients use App 422 for intrusion detection system 428. In some embodiments, the computing nodes 412-418 are arranged in a peer-to-peer architecture, with computing nodes 412-418 acting as both client and server.

Referring now to FIG. 7, a block diagram of the computing node 412, according to one or more embodiments of the disclosure. Computing node 412 is only one example of a suitable system and is not intended to suggest any limitation as to the scope of use or functionality of the embodiments described herein. Regardless, computing node 412 is capable of being implemented and/or performing any of the functionality set forth as described herein.

Computing node/server may be is operational with numerous other general purpose or special purpose computing system environments or configurations. Examples of well-known computing systems, environments, and/or configurations that may be suitable for use with computing node/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computing node/server 412 may be described in the general context of computer system, including executable instructions, such as program modules, being executed by a computer system. Generally, program modules may include routines, programs, objects, components, logic, data structures, and so on that perform particular tasks or implement particular abstract data types. Computing node/server 412 may be practiced in distributed computing environments where tasks are performed by remote processing devices that are linked through a network. In a distributed computing environment, program modules may be located in both local and remote computer system storage media including memory storage devices.

The components of computing node/server 412 may include, but are not limited to, one or more processors or processing units 529, a system memory 530, and a bus 531 that couples various system components including system memory 530 to processor 529.

Bus 631 represents one or more of any of several types of bus structures, including a memory bus or memory controller, a peripheral bus, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing node/server 412 typically includes a variety of computer readable media. Such media may be any available media that is accessible by computing node/server 412, and it includes both volatile and non-volatile media, removable and non-removable media. System memory 530 can include computer readable media in the form of volatile memory, such as random access memory (RAM) 532 and/or cache memory 533. Computing node/server 412 may further include other removable/non-removable, volatile/non-volatile computer storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 531 by one or more data media interfaces. As will be further depicted and described below, memory 530 may include at least one program product having a set (e.g., at least one) of program modules that are configured to carry out the functions of embodiments of the disclosure.

Program/utility 540, having a set (at least one) of program modules 542, may be stored in memory 530 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of one or more of the embodiments described herein.

Computing node/server 412 may also communicate with one or more external devices 544 such as a keyboard, a pointing device, speakers, headphones, a display 546, etc.; one or more devices that enable a user to interact with computing node/server 412; and/or any devices (e.g., network card, modem, etc.) that enable computing node/server 412 to communicate with one or more other computing devices. Such communication can occur via Input/Output (I/O) interfaces 548. Still yet, computing node/server 412 can communicate with one or more networks such as a local area network (LAN), a general wide area network (WAN), and/or a public network (e.g., the Internet) via network adapter 550. As depicted, network adapter 550 communicates with the other components of computing node/server 412 via bus 531. It should be understood that although not shown, other hardware and/or software components could be used in conjunction with computing node/server 412. Examples, include, but are not limited to microcode, device drivers, redundant processing units, external disk drive arrays, RAID systems, tape drives, and data archival storage systems, etc.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In such embodiments, programs on the remote computer and programs on the server can communicate over the network by using Hypertext Transfer Protocol (HTTP), Representational State Transfer (REST) calls, or other suitable networking protocol. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring again to FIG. 6, App 422 may be a seed that, when triggered, communicates a message to Indicator of Compromise System 428, as discussed further below. As discussed above, App 422 may be a set of instructions configured to be run on Computing Node 412-418. As such, App 422 may contain instructions causing Computing Node 412-418 to communicate directly with Indicator of Compromise System 428. In embodiments, Computing Node 412-418 may include data file 432. In embodiments of the invention data file 432 may be a seed. Data files 432 may be strategically placed on Computing Node 412-418 where they are likely to be discovered by intruders. For example, data files 432 may be located in folders or directories within the storage system 534 of Computing Node 412-418, such as system folders or folders commonly storing sensitive data, which are known to be attractive targets to intruders, unauthorized users, and the like. In embodiments, data files 432 may be named in such a manner so as to entice interaction by an intruder or unauthorized user. For example, data file 432 may have a name such as "password list," "bank accounts," "trade secrets," or similar, which are likely to lead an intruder, unauthorized user, or the like to believe that data file 432 contains valuable content. Accordingly, an intruder or unauthorized user is likely to interact with data file 432, such as by moving, copying, opening, or modifying data file 432. Computing Node 412-418 may be configured to update Indicator of Compromise System 428 with information that an interaction with seed 432 has occurred. Such information might include, for example, the nature of the interaction, a timestamp, and details of the user account that interacted with the seed.

In various embodiments, the indicator of compromise system 428 includes a collection of software modules/ executable instructions that are configured to analyze/processes interactions, or touch points, with seeds 432. In one or more embodiments, indicator of compromise system 428 can include an input analyzer module 430. Upon receiving notice of interaction with a seed, Indicator of Compromise System 428 assigns a fidelity score 434 to the interaction. In embodiments, a fidelity score 434 may be associated with a probability that an interaction with a seed was initiated by an intruder, unauthorized party, or the like. For example, backing up a password file might generate a low fidelity score. While the interaction would generate a signal to the indicator of compromise system, the input analyzer module could determine that copying the file to a known backup device at a known time was an authorized action. However, if the password file was copied over a network connection to a remote location at an odd hour, particularly when authorized users are unlikely to be working, the input analyzer module may determine a high probability the action was undertaken by an intruder, unauthorized user, or the like and assign a high fidelity score to the interaction with the password file. In embodiments, seeds may include more than one touch point. In general, the more touch points a seed includes, the more accurate the fidelity score becomes. However, some touch points may have a higher fidelity than other touch points.

In embodiments of the invention, a seed may include bait. Bait may include, for example, some piece or pieces of information causing an intruder to perform an action. For example, bait may be a QR code that an intruder scans or a web site URL that an intruder may visit. In embodiments, bait may be an email address, where the email address is configured to receive and log messages from an intruder. In embodiments, bait may be an email message. The email message, in turn, may include additional bait, such as QR codes, URLs, or the like. In embodiments, bait may be a virtual telephone number configured to log information about calls and/or text messages, and send a signal to the indicator of compromise system.

All interactions with touch points by an intruder, unauthorized user, or the like are logged and communicated to the Indicator of Compromise System. Accordingly, analyzer module 430 can assign a fidelity score 434 to further actions undertaken by an intruder or unauthorized user. Further yet, bait may include data that is particularly enticing to an intruder or unauthorized user. For example, bank account login details or other perceived high value information could be provided as bait. In such instances, login details may be for an account configured for monitoring and communication with Indicator of Compromise System. Interactions with perceived high value data could be assigned a very high fidelity score.

It is notable that intruders are not always remote users. An intruder may be a user within an organization such an employee or contractor. In such instances, the intruder may have authorized access to monitored systems but are using their privileges inappropriately such as by stealing information or for sabotage. Because of their authorized access, existing detection systems are unlikely to detect such intruders. A feature of enticing intruders with bait is that it is possible to track intruders who might otherwise escape detection. Further, by interacting with bait, intruders are identified with a high degree of confidence.

In embodiments of the invention, seeds are physical objects. In some embodiments, seeds are electronic devices. Examples of such electronic devices are laptops, cell phones, USB thumb drives, or the like. In embodiments, seeds are devices configurable to be tracked such as RFID chips, Apple AirTag®, BlueTooth®, GPS transmitters or the like. Such trackable devices may be incorporated into physical objects such as briefcases, bags, wallets, access cards/FOBs, or the like. Accordingly, physical objects may be used as seeds which transmit messages to the Indicator of Compromise System. For example, an executive briefcase, which may contain high value corporate files, may be a seed for the Indicator of Compromise System. Higher value objects might further be associated with higher fidelity scores.

Analyzer module 434 evaluates data points in assigning a fidelity score. In embodiments, multiple interactions with a seed may result in a higher fidelity score. For example, merely touching a data file may have a low fidelity score, whereas both copying a file and opening it may result in a much higher score. Similarly, different types of interactions may result in different types of scores. While touching a data file may have a low fidelity score, interacting with bait, such as accessing a monitored bank account used as bait, may result in a much higher score. Fidelity scores may also be associated with a value of the seed. As discussed above, value may be intrinsic or perceived. Accordingly, the indicator of compromise system can differentiate between unauthorized users and permissible users with a high degree of certainty.

According to embodiments of the invention, responses may be associated with a fidelity score, or with a range of scores. For example, a fidelity score of less than 25% may trigger only an email alert, a fidelity score of 50-70% may trigger a text alert notification, and a fidelity score of greater than 95% may trigger a notice to a rapid response team. Accordingly, the indicator of compromise system is configurable to trigger responses that are commensurate with the level of a threat, and do so in near real-time.

Figure 8:
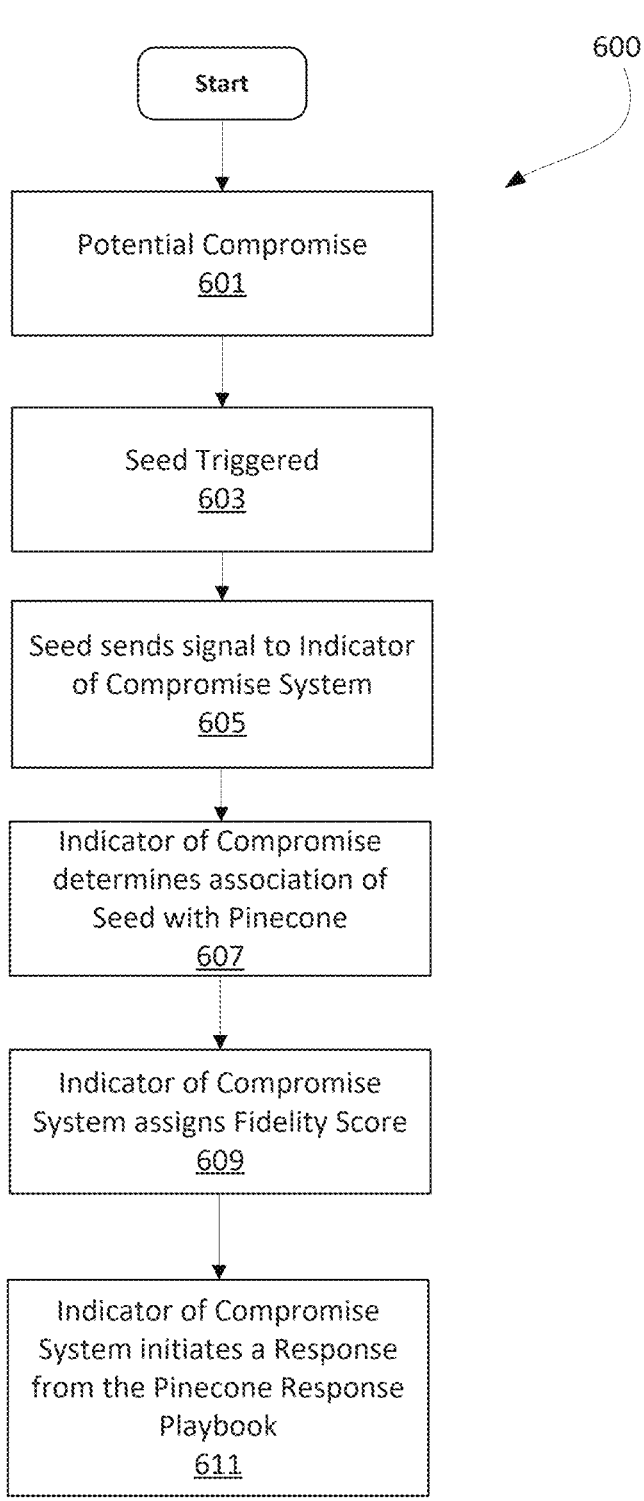
FIG. 8 depicts a flowchart diagram of operations of an indicator of compromise system, as may be implemented in accordance with the present disclosure.

Referring to FIG. 8, a flow chart illustrates operations 600 performed by an Indicator of Compromise system. Some operations may be initiated by an intruder or unauthorized user. Other operations may be performed by executing instructions at a computing node as discussed above. At a first step, a potential comprise 601 occurs, causing a seed to be triggered 603. Upon triggering, the seed sends a signal to the Indicator of Compromise system 605. The Indicator of Compromise System determines the association of the seed with a pinecone 607 and assigns a fidelity score 609 to the potential compromise. The Indicator of Compromise system then initiates a response from the pinecone's response playbook 611. As discussed above, the response may be determined by the seed and/or the fidelity. Further, the response may be determined by the response playbook. For example, if a first point of contact did not respond, the system may send an alert to a second point of contact. It is understood that operations 600 may occur in a different order than shown in FIG. 8. Further, some operations 600 may occur contemporaneously or not at all.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" or "module" (also sometimes "circuit-based module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server or computer-based/implemented system includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, an endpoint device (or endpoint) includes a communication circuit and (computer) processing circuits which are configured to access other systems when such access is granted. The communications circuit can be enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a user entity may include an endpoint device (as above) that may access systems and/or data. In certain embodiments, a processing circuit or circuitry, as may be implemented herein, is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

It is recognized and appreciated that as specific examples, the above-characterized figures and discussion are provided to help illustrate certain aspects (and advantages in some instances) which may be used in the manufacture of such structures and devices. These methods, structures and devices may include the exemplary structures and devices described in connection with each of the figures as well as other devices, as each such described embodiment has one or more related aspects which may be modified and/or combined with the other such devices and examples as described hereinabove may also be found in the above-referenced Provisional Application.

The skilled artisan would also recognize various terminology as used in the present disclosure by way of their plain meaning. As examples, the specification may describe and/or illustrates aspects useful for implementing the examples by way of various processes, circuits which may be illustrated as or using terms such as blocks, modules, device, system, unit, controller, and/or other circuit-type depictions. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method comprising:

via data-processor computing circuitry, generating, for a user entity, a persistent fidelity score for the user entity, based on activity of the user entity over a time period that includes an initial time period during which the user entity is selectively granted access a computer-based system based on the persistent fidelity score, such that the user entity may use one or more assets of the computer-based system, and that further includes an ensuing time period during which the user entity continues to access the computer-based system, such that the user entity may continue to use the one or more assets of the computer-based system; and during the ensuing time period, updating the persistent fidelity score for the user entity based on further activity information corresponding to the user entity, and selectively denying continued access to the computer-based system by the user entity, in response to the updated persistent fidelity score being outside a threshold tolerance, such that the user entity is prevented from continuing to use the one or more assets of the computer-based system.

2. The method of claim 1, wherein selectively denying continued access to the computer-based system includes assessing a type of access to be provided to the user entity relative to a security characteristic associated with the type of access, and setting the threshold tolerance based on the assessed type of access.

3. The method of claim 1, wherein updating the persistent fidelity score includes tracking activities of the user entity and updating the persistent fidelity score based on the tracked activities.

4. The method of claim 1, wherein generating the persistent fidelity score includes generating respective scores for a plurality of user entities including the user entity, further including maintaining data that characterizes a security metric for each of the plurality of user entities, wherein updating the persistent fidelity score includes updating the persistent fidelity score for one of the user entities in response to changes affecting the security metric for the one of the user entities.

5. The method of claim 1, wherein selectively denying continued access includes ascertaining the threshold tolerance based on security level characteristics of the type of the request for access.

6. The method of claim 1, further including setting the threshold tolerance based on external activity information corresponding to a type of the access selectively granted to the user entity.

7. The method of claim 1, wherein generating the persistent fidelity score includes generating respective scores for a plurality of user entities including the user entity, further including setting the threshold tolerance based on a type of the access for which the threshold tolerance is being set, and applying the threshold tolerance to access requires by disparate ones of the user entities.

8. The method of claim 1, wherein generating the persistent fidelity score includes generating respective scores for a plurality of user entities including the user entity, further including monitoring interactions between the user entities and predefined interaction points, and updating the persistent fidelity score for each user entity in response to the user entity interacting with one or more of the predefined interaction points.

9. The method of claim 8, further including grouping a set of the predefined interaction points, wherein updating the score in response to the user entity interacting with one or more of the predefined interaction points includes updating the score based on the interactions between the user entities and two or more of the predefined interaction points grouped in the set.

10. The method of claim 1, wherein selectively denying continued access to the computer-based system includes terminating previously-granted access for the user entity in response to changes in the persistent fidelity score.

11. The method of claim 1, further including setting the threshold tolerance for a plurality of disparate types of continued accesses, and updating the threshold tolerances during the ensuring time period based on conditions relating to each of the disparate types of continued accesses, wherein selectively denying continued access to the computer-based system includes selectively denying access via one or more of the disparate types of continued accesses using the updated threshold tolerance for the one of the disparate types of continued accesses.

12. The method of claim 1, wherein the steps of generating and updating the persistent fidelity score include generating and updating a plurality of persistent fidelity scores respectively for a plurality of user entities including the user entity, and displaying the persistent fidelity scores.

13. The method of claim 12, further including generating alerts pertaining to changes in the persistent fidelity scores.

14. The method of claim 1, further including weighting a plurality of different types of security artifacts, each artifact corresponding to respective activities of the user entity, and wherein the steps of generating and updating the persistent fidelity score include applying the weighting to ones of the security artifacts corresponding to activities that the user entity has carried out.

15. The method of claim 14, further including dynamically changing the weights applied to each of the plurality of different types of security artifacts in response to contextual changes involving aspects selected from the group of: rules defined for a particular user entity, rules defined for a particular type of access to the computer-based system, user entity location, user entity history, and a combination thereof.

16. An apparatus comprising:

communications circuitry to communicate with a plurality of endpoint devices that provide interaction for user entities and access to a computer-based system; and one or more processing circuits to:

generate, for each user entity, a persistent fidelity score for the user entity, based on activity of the user entity over a time period that includes an initial time period during which the user entity is selectively granted access to the computer-based system based on the persistent fidelity score, such that the user entity may use one or more assets of the computer-based system, and that further includes an ensuring time period during which the user entity continues to access the computer-based system such that the user entity may continue to use the one or more assets of the computer-based system; and during the ensuring time period, update the persistent fidelity score for the user entity based on further activity information corresponding to the user entity, and selectively deny continued access to the computer-based system by the user entity, in response to the updated persistent fidelity score being outside a threshold tolerance, such that the user entity is prevented from continuing to use the one or more assets of the computer-based system.

17. The apparatus of claim 16, wherein the one or more processing circuits is to selectively deny the continued access to the computer-based system by assessing a type of continued access to be provided to the user entity relative to a security characteristic associated with the type of continued access, and setting the threshold tolerance based on the assessed type of continued access.

18. The apparatus of claim 16, wherein the one or more processing circuits is to update the persistent fidelity score by tracking activities of the user entity and update the persistent fidelity score based on the tracked activities.

19. The apparatus of claim 16, wherein the one or more processing circuits is to maintain data that characterizes a security metric for each of the user entities, and to update the persistent fidelity score by updating the persistent fidelity score in response to changes affecting the security metric for the user entity to which access is selectively granted.

20. A method comprising:

maintaining a persistent fidelity score for a user entity, by generating the fidelity score and subsequently updating the fidelity score over a time period during which the user entity accesses a computer-based system, based on activity of the user entity over the time period, such that the user entity may use one or more assets of the computer-based system; and selectively denying continued access to the computer-based system by the user entity during the time period, in response to the updated fidelity score being outside a threshold tolerance and based on the characteristics associated with the user entity, such that the user entity is prevented from continuing to use the one or more assets of the computer-based system.

* * * * *